United States Patent
Uebelacker et al.

(10) Patent No.: US 9,610,864 B2
(45) Date of Patent: Apr. 4, 2017

(54) VEHICLE SEAT AND UTILITY MOTOR VEHICLE COMPRISING A VEHICLE SEAT

(71) Applicant: GRAMMER AG, Amberg (DE)

(72) Inventors: Roland Uebelacker, Pfreimd (DE);
Erwin Himmelhuber, Sulzbach-Rosenberg (DE); Gerhard Delling, Schmidgaden (DE)

(73) Assignee: Grammar AG, Amberg (DE)

( * ) Notice: Subject to any disclaimer, the term of this patent is extended or adjusted under 35 U.S.C. 154(b) by 127 days.

(21) Appl. No.: 14/278,163

(22) Filed: May 15, 2014

(65) Prior Publication Data

US 2015/0015046 A1 Jan. 15, 2015

(30) Foreign Application Priority Data

Jun. 26, 2013 (DE) .......... 10 2013 106 719
Sep. 20, 2013 (DE) .......... 10 2013 110 448

(51) Int. Cl.
*B60N 2/22* (2006.01)
*B60N 2/48* (2006.01)
(Continued)

(52) U.S. Cl.
CPC ......... *B60N 2/2209* (2013.01); *B60N 2/2222* (2013.01); *B60N 2/38* (2013.01); *B60N 2/4867* (2013.01); *B60N 2002/0204* (2013.01); *B60N 2002/0216* (2013.01); *B60N 2002/0288* (2013.01)

(58) Field of Classification Search
CPC ...... B60N 2/2222; B60N 2/38; B60N 2/4867; B60N 2002/0204; B60N 2002/0216; B60N 2/2209; B60N 2002/0288
See application file for complete search history.

(56) References Cited

U.S. PATENT DOCUMENTS

| 769,495 A | 9/1904 | Schroeder |
| 937,343 A | 10/1909 | Wallace |

(Continued)

FOREIGN PATENT DOCUMENTS

| AT | 321497 | 4/1975 |
| DE | 1796557 | 9/1959 |

(Continued)

OTHER PUBLICATIONS

Notice of Allowance for U.S. Appl. No. 13/691,055, mailed Nov. 12, 2015, 9 pages.
(Continued)

*Primary Examiner* — Philip Gabler
(74) *Attorney, Agent, or Firm* — Sheridan Ross P.C.

(57) ABSTRACT

The invention relates to a vehicle seat, in particular a utility motor vehicle seat, having a seat part, having a backrest comprising a lower backrest part and an upper backrest part, and having a holding device, by means of which the upper backrest part is mounted displaceably with respect to the lower backrest part, the holding device comprising a guide roller device, by means of which the upper backrest part is arranged laterally displaceably with respect to the lower backrest part along a displacement curve so as to mount the upper backrest part displaceably at least in part past the side edge of the lower backrest part.

10 Claims, 9 Drawing Sheets

(51) Int. Cl.
*B60N 2/38* (2006.01)
*B60N 2/02* (2006.01)

(56) References Cited

U.S. PATENT DOCUMENTS

| | | | |
|---|---|---|---|
| 1,257,427 A | 2/1918 | Underwood | |
| 2,219,799 A | 10/1940 | Zuck et al. | |
| 2,306,334 A | 12/1942 | Costas | |
| 2,777,531 A | 1/1957 | Erickson | |
| 2,835,311 A | 5/1958 | Reeves et al. | |
| 3,300,249 A * | 1/1967 | Schneider | A47C 7/38 297/408 |
| 3,342,528 A * | 9/1967 | Radke | A47C 7/48 297/284.1 |
| 3,348,880 A | 10/1967 | Swann | |
| 3,393,938 A * | 7/1968 | Meyer | B60N 2/4879 248/118 |
| 3,888,329 A | 6/1975 | Monaghan | |
| 4,108,493 A | 8/1978 | Naus | |
| 4,195,882 A | 4/1980 | Daswick | |
| 4,634,176 A | 1/1987 | Scott | |
| 4,679,854 A | 7/1987 | Putsch et al. | |
| 5,108,150 A | 4/1992 | Stas | |
| 5,154,477 A | 10/1992 | Lacy | |
| 5,211,696 A | 5/1993 | Lacy | |
| 5,308,028 A | 5/1994 | Kornberg | |
| 5,547,247 A | 8/1996 | Dixon | |
| 5,567,015 A | 10/1996 | Arias | |
| 5,803,542 A | 9/1998 | Insausti | |
| 6,079,784 A | 6/2000 | Peachey | |
| 6,224,149 B1 | 5/2001 | Gevaert | |
| 6,305,749 B1 | 10/2001 | O'Connor et al. | |
| 6,513,781 B1 | 2/2003 | Meyer et al. | |
| 6,648,416 B2 | 11/2003 | O'Connor et al. | |
| 6,893,095 B2 | 5/2005 | Schambre et al. | |
| 6,942,297 B2 | 9/2005 | Johnson | |
| 7,178,874 B2 | 2/2007 | Demski | |
| 7,210,735 B2 | 5/2007 | Lang | |
| 7,640,090 B2 * | 12/2009 | Uchida | B60N 2/002 297/216.1 |
| 7,780,237 B2 | 8/2010 | Chen et al. | |
| 7,931,331 B2 | 4/2011 | Gomes et al. | |
| 8,007,045 B2 | 8/2011 | Meiller et al. | |
| 8,794,705 B2 | 8/2014 | Steinmetz et al. | |
| 8,998,335 B2 * | 4/2015 | Buehlmeyer | B60N 2/38 297/383 |
| 9,120,405 B2 * | 9/2015 | Buehlmeyer | B60N 2/4855 |
| 9,221,362 B2 * | 12/2015 | Schneider | B60N 2/2209 |
| 9,283,871 B2 * | 3/2016 | Uebelacker | B60N 2/4867 |
| 2001/0000639 A1 | 5/2001 | Park et al. | |
| 2003/0155797 A1 | 8/2003 | Amirault et al. | |
| 2003/0178880 A1 | 9/2003 | Hannah | |
| 2005/0194827 A1 | 9/2005 | Dowty et al. | |
| 2013/0134753 A1 * | 5/2013 | Buehlmeyer | B60N 2/38 297/284.1 |
| 2013/0175837 A1 | 7/2013 | Buehlmeyer et al. | |
| 2013/0181500 A1 | 7/2013 | Buehlmeyer et al. | |

FOREIGN PATENT DOCUMENTS

| | | |
|---|---|---|
| DE | 7228055 | 11/1972 |
| DE | 2551617 | 6/1977 |
| DE | 2644485 | 4/1978 |
| DE | 3046049 | 7/1982 |
| DE | 4126518 | 2/1993 |
| DE | 4215628 | 11/1993 |
| DE | 4405397 | 3/1995 |
| DE | 19937378 | 7/2000 |
| DE | 19920220 | 11/2000 |
| DE | 20307102 | 10/2003 |
| DE | 69913203 | 9/2004 |
| DE | 19628861 | 6/2005 |
| DE | 102004007043 | 6/2005 |
| DE | 102004052604 | 4/2006 |
| DE | 60116924 | 11/2006 |
| DE | 102006028453 | 12/2007 |
| DE | 102007044319 | 7/2008 |
| DE | 102007012133 | 9/2008 |
| DE | 202007016357 | 3/2009 |
| DE | 102010009526 | 8/2011 |
| DE | 102011055895 | 6/2013 |
| EP | 0729867 | 9/1996 |
| EP | 0972671 | 1/2000 |
| EP | 2599658 | 6/2013 |
| EP | 2599659 | 6/2013 |
| FR | 2748432 | 11/1997 |
| FR | 2895336 | 6/2007 |
| FR | 2927855 | 8/2009 |
| FR | 2929185 | 10/2009 |
| FR | 2930208 | 10/2009 |
| FR | 2932429 | 12/2009 |
| GB | 2277869 | 11/1994 |
| GB | 2453165 | 4/2009 |
| GB | 2472836 | 2/2011 |
| WO | WO 03/068556 | 8/2003 |
| WO | WO 2011/020919 | 2/2011 |

OTHER PUBLICATIONS

Official Action for U.S. Appl. No. 14/278,127, mailed Dec. 18, 2015, 6 pages Restriction Requirement.
Final Action for U.S. Appl. No. 14/278,190, mailed Oct. 29, 2015, 8 pages.
Notice of Allowance for U.S. Appl. No. 14/314,519, mailed Oct. 15, 2015, 5 pages.
European Search Report for European Patent Application No. 14163934.4, mailed Oct. 28, 2014, 6 pages.
Official Action (no English translation available) for German Patent Application No. 102013106721.2 dated Mar. 11, 2014, 3 pages.
Official Action for U.S. Appl. No. 13/686,337, mailed Dec. 2, 2014 12 pages.
Notice of Allowance for U.S. Appl. No. 13/686,409 mailed Nov. 28, 2014, 8 pages.
Official Action for U.S. Appl. No. 13/691,055, mailed Sep. 19, 2014, 9 pages.
Official Action (no English translation available) for German Patent Application No. 12194557.0, dated Jan. 29, 2015, 5 pages.
Official Action (no English translation available) for German Patent Application No. 102013110445.2 dated Mar. 10, 2014, 3 pages.
Official Action (no English translation available) for German Patent Application No. 102013110448.7 dated Mar. 10, 2014, 3 pages.
Official Action (no English translation available) for German Patent Application No. 102013110416.9 dated Mar. 7, 2014, 3 pages.
Examination Report for German Patent Application No. 102010018822.0, dated Jan. 31, 2013, 3 pages.
Examination Report for German Patent Application No. 102011055895.0, dated Feb. 29, 2012, 3 pages.
Examination Report for German Patent Application No. 102011055895.0, dated Oct. 2, 2012, 3 pages.
Extended European Search Report for European Patent Application No. 12194405.2, mailed Feb. 8, 2013, 3 pages.
Extended European Search Report for European Patent Application No. 12194557, mailed Feb. 7, 2013, 3 pages.
Examination Report for German Patent Application No. 102011055897.7, dated Feb. 27, 2012, 3 pages.
Official Action for German Patent Application No. 102012104184.9 dated Jan. 21, 2013, 3 pages.
Official Action for U.S. Appl. No. 13/686,409 mailed Apr. 24, 2014, 12 pages.
Official Action for U.S. Appl. No. 13/686,337 mailed Apr. 24, 2014, 11 pages.
Notice of Allowance for U.S. Appl. No. 13/686,337, mailed Apr. 24, 2015 9 pages.
Final Action for U.S. Appl. No. 13/691,055, mailed Feb. 24, 2015, 9 pages.
Official Action for U.S. Appl. No. 13/691,055, mailed Jun. 3, 2015, 8 pages.

(56) References Cited

OTHER PUBLICATIONS

Official Action for U.S. Appl. No. 14/278,190, mailed May 22, 2015, 8 pages.
Official Action for U.S. Appl. No. 14/314,519, mailed Jun. 25, 2015, 9 pages.
Examination Report for German Patent Application No. 102011055897.7, dated Jul. 25, 2014, 8 pages.
Extended European Search Report for European Patent Application No. 14163935.1, dated Oct. 30, 2014, 6 pages.
Official Action (with English translation) for Chinese Patent Application No. 2012104992473, dated Nov. 3, 2014, 13 pages.
Official Action (with English translation) for Chinese Patent Application No. 201210489228, dated Dec. 1, 2014, 29 pages.
Official Action for U.S. Appl. No. 14/278,127, mailed Mar. 29, 2016 10 pages.
Official Action for U.S. Appl. No. 14/278,127, mailed Jul. 18, 2016 12 pages.
Notice of Allowance for U.S. Appl. No. 14/278,190, mailed Jan. 13, 2016.

\* cited by examiner

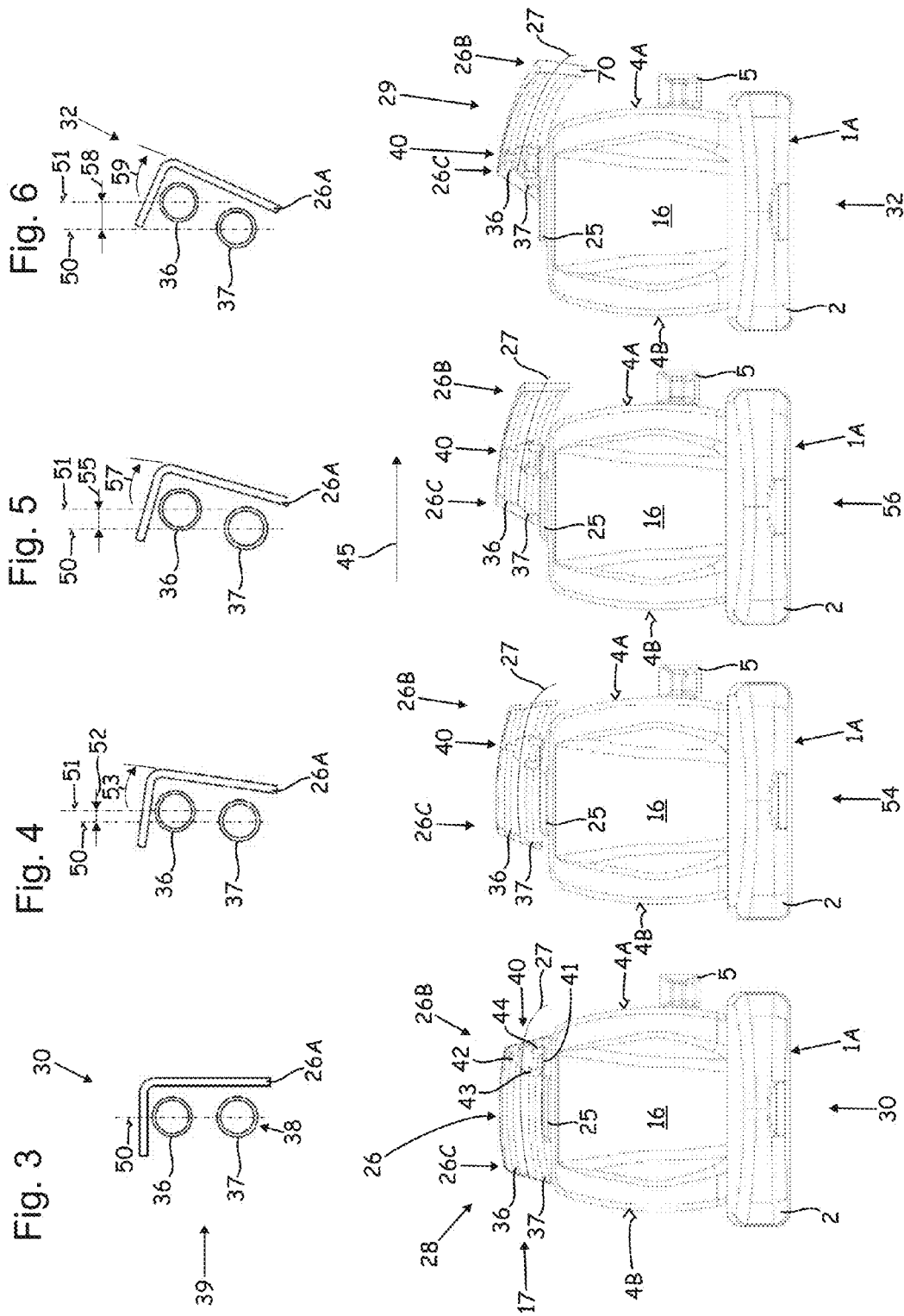

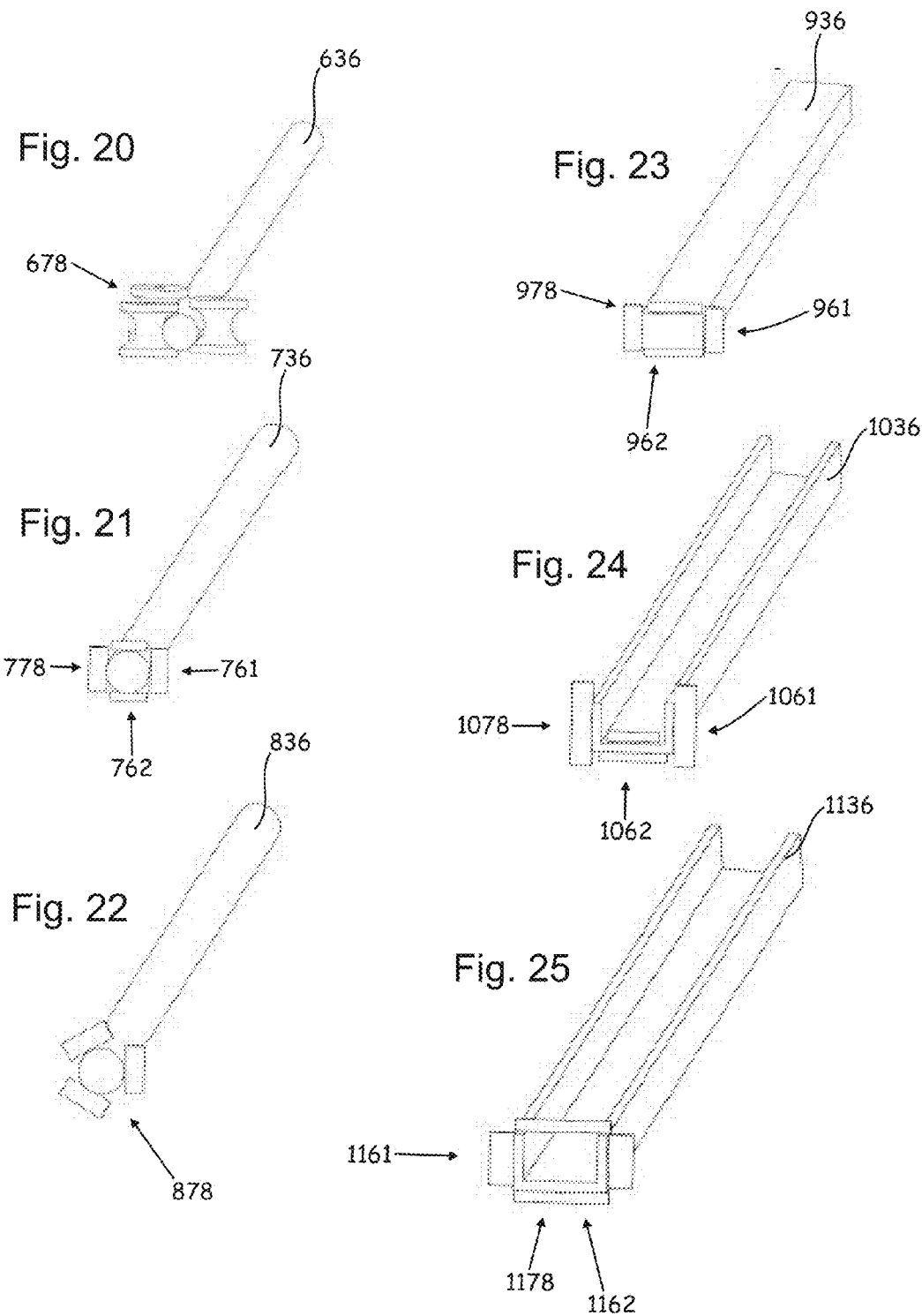

VEHICLE SEAT AND UTILITY MOTOR VEHICLE COMPRISING A VEHICLE SEAT

CROSS-REFERENCE TO RELATED APPLICATIONS

This application claims the benefit of German Patent Application No. 10 2013 106 719.0 filed Jun. 26, 2013, and German Patent Application No. 10 2013 110 448.7 filed Sep. 20, 2013, the disclosures of each of which are incorporated herein by reference.

FIELD

The invention relates to a vehicle seat, in particular a utility motor vehicle seat, comprising a seat part, comprising a backrest having a lower backrest part and an upper backrest part, and comprising a holding device, by means of which the upper backrest part is mounted displaceably with respect to the lower backrest part. The invention further relates to a utility motor vehicle, in particular an agricultural utility motor vehicle, comprising at least one vehicle seat.

BACKGROUND

Numerous conventional vehicle seats, in particular for utility motor vehicles and specifically for agricultural utility motor vehicles, are in various manners well-known from the art.

In particular drivers of agricultural utility vehicles, during their work with these agricultural vehicles and the working equipment attached thereto, often take up a further, laterally or rearwardly orientated seated working posture—differing from the normal seated working posture which is orientated forwards, in other words in the direction of travel—over a relatively long period, for example so as to be better able to reach and operate operating elements located at the side rear in the vehicle cabin, or else merely so as to be better able to observe operating equipment which is attached behind the agricultural utility motor vehicle.

So as to give the driver easier operating access to rearwardly located operating elements in this laterally or rearwardly orientated seated working posture, or merely so as to be better able to see or observe a rear operating region behind a vehicle seat, Offenlegungsschrift DE 30 46 049 A1 discloses a vehicle seat in which the backrest is divided at least in two, and in this context accordingly has an upper backrest part and a lower backrest part, at least the upper backrest part being pivotable about a vertical axis. As a result, the driver can at any time turn his/her torso or respectively upper body, for example so as to reach the operating elements positioned behind the vehicle seat, since the upper backrest part can rotate about this vertical axis. In this context, the driver can indeed reach backwards past the lower backrest part without difficulty, since the upper backrest part is rotated about the vertical axis; however, with this solution the driver has very unsatisfactory support, or none at all, for his upper body in a corresponding laterally or rearwardly orientated seated working posture. The driver is thus not significantly supported by the upper backrest part.

In another, more recent solution, drivers can intermittently rotate the entire vehicle seat, in other words substantially the entire rigid seat construction including the seat part and the backrest, about a defined vertical axis of rotation by means of a rotation adapter, so as to be better able to reach a rear space within the vehicle cabin or respectively observe a rear space outside the vehicle cabin. In this context, the seat part remains stationary with respect to the backrest as a whole. Any accessories on the vehicle seat, for example a multifunctional armrest, thus rotate together with respect thereto. However, operating levers which are arranged further back to the side in the vehicle cabin still cannot be actuated comfortably as a result.

This last solution further results in the driver having to turn himself out of a comfortable seat cushion contour of the vehicle seat, so as in particular to be able to continue operating the pedals of the agricultural vehicle reasonably reliably. This in turn can lead to pressure points and thus to discomfort especially in the driver's seat and thigh region.

Specifically the back cushion contour is currently formed in such a way that the driver is supported as much as possible in the forwardly directed vehicle seat stance, without depriving him of the necessary degree of freedom which he requires for his movements in driving operation. So as not to obstruct freedom of movement in the shoulder/arm region, the back cushion of the backrest must not be too contoured in the upper region. However, so as to ensure good support and thus sufficiently good load relief for the driver, a support surface should always be as large as possible in all driving positions. For the aforementioned reasons, such as the required degrees of freedom for good movement, this can currently only be achieved under some conditions and thus in an unsatisfactory manner, since the driver is alternating between two extremely different driving positions.

A further major drawback is that the possible pivot range of the rotary adapter is limited because, even when the rear operating equipment is being observed, the utility motor vehicle still has to be controlled safely via the pedals and the steering wheel. To meet these demands, the driver often has to assume a constrained posture, which inevitably leads to critical torsion of his whole body, over a relatively long period. Scientific studies additionally show that a constrained posture of this type can lead to damage to body structures in particular when vibrations are applied, especially if the body is not sufficiently well supported. It is further established that the load on the spinal column can be reduced significantly by good support via the backrest part.

SUMMARY

An object of the invention is to offer a driver improved seat comfort, especially when he has to take up a constrained posture of this type, so that he is able to drive an agricultural utility motor vehicle reliably and in particular in a safe manner. In addition, a further object of the invention is to protect the driver from premature fatigue when assuming this constrained posture.

The object of the invention is achieved by a vehicle seat, in particular by a utility motor vehicle seat, having a seat part, having a backrest comprising a lower backrest part and an upper backrest part, and having a holding device, by means of which the upper backrest part is mounted displaceably with respect to the lower backrest part, the vehicle seat being characterized in that the holding device comprises a guide roller device, by means of which the upper backrest part is arranged laterally displaceably with respect to the lower backrest part along a displacement curve so as to mount the upper backrest part displaceably at least in part past the side edge of the lower backrest part.

The present guide roller device is particularly suitable for ensuring low-wear and thus also lasting play-free mounting of the upper backrest part, by means of which mounting even large support forces can be received and transmitted.

This is particularly important for strong impact loads, which occur frequently in particular in utility motor vehicles used for agricultural purposes.

In particular if a utility motor vehicle seat is equipped with a guide roller device of this type, it is possible for the driver to be supported particularly well in a rearwardly directed constrained posture, without the upper backrest part of the backrest blocking his/her access to operating elements located behind the vehicle seat or respectively his/her view of operating equipment being towed by the utility motor vehicle.

In contrast to the solutions known from the art, by means of the upper backrest part the driver's torso can now advantageously additionally be supported in the event of a laterally or rearwardly directed constrained posture, resulting in particularly advantageous relief of the driver's body structures or respectively torso structures, in such a way that premature fatigue can also be prevented and thus the efficiency of work can also be increased.

By means of the guide roller device according to the invention, it is possible in a constructionally particularly simple manner to shift the upper backrest part from a parked position, which is placed directly above the lower backrest part and is preferably in the centre of the backrest, and into a support position located to the side of the backrest, so as to make additional driver torso support possible there.

So as to be able to achieve a wide range of effects in relation to the guide roller device, said device may be configured in a variety of ways, as is explained further in the following.

Within the meaning of the invention, the term "seat part" denotes the region of the vehicle seat on which the seat of the driver is placed. The seat part thus forms a corresponding seat surface by way of seat part cushion elements.

Accordingly, the term "backrest" describes a region of the vehicle seat on which the driver can support himself/herself, basically via his/her back, while he/she is sitting on the seat part. The backrest accordingly extends upwards past the seat part from the rear end of the seat part.

In this context, the backrest is divided into an upper backrest part and a lower backrest part, the upper backrest part being mounted displaceably with respect to the lower backrest part, and thus also with respect to the seat part, by means of the guide roller device.

The lower backrest part is preferably arranged on the vehicle seat in a stationary manner with respect to the seat part. However, this is not absolutely compulsory. The lower backrest part thus forms a part of the backrest which is stationary with respect to the seat part.

The upper backrest part thus forms a part of the backrest which is laterally displaceable with respect to the seat part.

The holding device is provided for this purpose, which is ideally attached directly to the lower backrest part, so as to be able to shift the upper backrest part along a displacement curve with respect to this lower backrest part. However, with a configuration of this type of the vehicle seat, it is also possible for this holding device to be provided in another region of the backrest or respectively on a frame of the vehicle seat. Alternatively, this holding device may also be provided on the body side of the respective utility motor vehicle, so as to be able to mount the upper backrest part linearly displaceably in this manner with respect to the lower backrest part.

In any case with the present upper backrest part within the meaning of the invention, an additional driver torso support device, which can be arranged outside the seat part and the backrest, can be provided so as to support the driver in the constrained posture with respect to a laterally or rearwardly orientated seated working posture.

Accordingly, a considerable improvement in seat comfort is achieved with this upper backrest part which is guided in accordance with the invention.

On the other hand, the driver is also further protected from premature fatigue, in particular if he/she has to visually monitor the rear region of the utility motor vehicle over a long period. In this way in particular, the risk of accident is greatly reduced and work safety is thus increased.

The upper backrest part and respectively the driver torso support device incorporated thereby can be arranged temporarily at least in part in a support region, which is otherwise free from vehicle seat, at the level of the region of the upper half of the backrest and laterally off-centre from the backrest, in such a way that the driver sitting on the vehicle seat is supported laterally off-centre from the backrest at least at the level of his/her shoulder and/or ribcage region during a laterally or rearwardly orientated seated working posture, the additional driver torso support device being arranged displaceably from the parked position into an additional support position, in the support region which is otherwise free from vehicle seat, using a displacement device.

In the present case, the displacement device is the guide roller device.

Advantageously, the driver can be relieved extremely well by the additional driver torso support device arranged in this manner while assuming a constrained posture, in particular the above-described laterally or rearwardly orientated seated working position. Also, the additional driver torso support device is available, although preferably only when it is required. Otherwise, for example in a forwardly orientated driving position, the additional driver torso support device does not interfere, since it remains in the idle position or respectively original parked position thereof.

Advantageously, the additional driver torso support device and thus also the upper backrest part can be arranged in such a way that the driver sitting on the vehicle seat is supported at least at the level of his shoulder and/or ribcage region, laterally off-centre from the backrest, during a laterally or rearwardly orientated seated working posture.

Within the meaning of the invention, the term "additional driver torso support device" describes a device for additional torso support for the driver during a constrained posture on the vehicle seat. The constructional implementation of this additional driver torso support device can be achieved in a particularly simple manner using the upper backrest part disclosed herein, in such a way that for a constructional configuration of this type the two terms can be used synonymously.

In the present context, the term "torso" anatomically describes the central region of the human body, and the torso comprises the ribcage, the stomach, the back and the pelvis of the human body.

It is thus advantageous if the additional driver torso support device comprises a contact surface for the driver's back and/or shoulder region, the contact surface advantageously being shaped ergonomically so as to correspond particularly well to the anatomy of the human body. First, this means that the driver will accept frequent use of an additional torso support of this type. At the same time, the body of the driver is protected from injuries particularly well by a contact surface of this type, since conditions are often very rough, specifically when working in the fields with agricultural utility vehicles, and in this context the driver is grateful for any targeted torso support.

However, not only a contact surface shaped in this manner is advantageous. Rather, it is even better to place this contact surface so that it is also correctly orientated in the space. This is possible in a surprisingly constructionally simple and particularly effective manner with the present guide roller device, as explained in detail in connection with the upper backrest part.

Within the meaning of the invention, the term "torso support region which is free from vehicle seat" describes a region of the vehicle seat in which permanent support devices of the vehicle seat cannot reasonably be arranged permanently, since they would have too great a disruptive effect on the driver in normal driving operation.

In this context, the present torso support region which is free from vehicle seat is positioned on the one hand substantially in the upper third of the backrest, in other words above half the height of the backrest and thus often also in the direct lateral or respectively rearward viewing region of the driver. It may further also extend above the upper third. This already means that this torso support region which is free from vehicle seat absolutely has to be kept free at least in normal forward driving operation. Accordingly, it should not be confused with a conventional support region. On the other hand, the torso support region which is free from vehicle seat within the meaning of the invention is located off-centre from the backrest. This already means that it cannot be confused with a conventional support region in which a head support is placed. This is partly because the torso support region which is free from vehicle seat is additionally arranged in front of the backrest or respectively a backrest cushion element and to the side thereof. Thus, the present torso support region which is free from vehicle seat is also provided above and to the side of the seat part of the vehicle seat.

Herein, the description "laterally or rearwardly orientated seated working posture" refers to a constrained posture of the driver in terms of an upper body rotation, so as to be better able to observe a rearward working region in particular behind the agricultural utility motor vehicle.

At this point, it should be noted that the present inventive vehicle seat can not only be used advantageously in relation to a driver. Rather, the vehicle seat according to the invention can be used in virtually any field of application in which an additional torso support is to be provided at least temporarily in the vicinity of the vehicle seat.

The additional driver torso support device can be displaced particularly stably from the parked position into the additional torso support position or respectively support position if the displacement device comprises means for translational displacement of the additional driver torso support device, as is the case for the present guide roller device with respect to the upper backrest part.

A variant configuration which is particularly advantageous in this connection provides that the guide roller device is configured in such a way that the upper backrest part additionally rotates about the displacement curve and/or about a transverse axis transverse to the displacement curve during the lateral displacement.

The present driver torso support is achieved not only in that the upper backrest part is linearly displaceable along the displacement curve laterally past at least one of the side edges of the lower backrest part, but also in that the upper backrest part additionally further rotates about this displacement axis, causing the upper backrest part also to be inclined rearwards, meaning that in particular a support surface for the driver's torso is positioned orientated unusually well in a support region which is otherwise free from vehicle seat.

This support surface can be configured particularly well with backrest cushion parts which are correspondingly provided on the upper backrest part, these backrest cushion parts thus being linearly displaceable together with the upper backrest part.

Correspondingly, it will be appreciated that the upper backrest part, but also the lower backrest part, may each have cushion parts for cushioning the backrest as a whole, these cushion parts accordingly being arranged displaceably with respect to one another.

In addition or alternatively, the upper backrest part rotates about a transverse axis extending transverse to the longitudinal displacement axis during the lateral displacement thereof, meaning that the upper backrest part can additionally further be inclined downwards about this transverse axis with respect to the lateral extension of the upper backrest part, meaning that the support comfort for the driver can be improved even further.

The lateral extension of the upper backrest part is substantially flush with the vehicle lateral extension, in particular when the upper backrest part is located in the parked position thereof.

The transverse axis is basically a horizontal axis which is arranged in a transverse manner to the displacement curve.

In this context, the displacement curve ideally extends in a transverse manner to the primary seating direction inherent to the vehicle seat, the primary seating direction normally extending in the direction of the vehicle longitudinal extension. The upper backrest part can thus be displaced into a lateral region of the vehicle seat, and can thus advantageously be repositioned if necessary in such a way that the driver can turn or respectively bend his/her shoulder/arm region past the lower backrest part, where the upper backrest part was previously still arranged in the parked position thereof, and nevertheless still be supported in the upper region of his back by the upper backrest part which has been displaced into the support position.

The displacement curve may be a physical shaft component or an imaginary axis outside one or more components or an assembly.

It is thus advantageous if the displacement curve is arranged extending transverse to the primary seating direction of the vehicle seat.

Herein, the displacement curve ideally extends in the primary displacement direction in which the upper backrest part is laterally displaced past the side edge of the lower backrest part.

The above-described movement sequence of the upper backrest part can be constructionally implemented in a particularly simple manner if the guide roller device is configured helically at least in part.

For example, the guide roller device comprises one or more guide elements for this purpose, which are arranged extending helically, in other words in a screw shape, about the displacement curve, in such a way that the upper backrest part can rotate about this displacement curve in a constructionally simple manner in the case of a corresponding linear displacement.

The upper backrest part is thus advantageously mounted rotatably about the displacement curve as a function of a linear displacement in this case.

Herein, within the meaning of the invention, the term "guide elements" refers to elongate roller-guided guide elements which are mounted on roller bodies. It is clearly also possible to provide more than two guide elements of this type, meaning that the stability of the linear guide roller device can be increased; however, this also correspondingly complicates the constructional complexity.

It will be appreciated that helical guide elements of this type can be constructionally implemented in various ways, so as to configure the linear guide device helically at least in part. For example, a guide element of this type equipped with guide grooves and/or guide webs is twisted on itself along the displacement curve.

It has been found in practice that the holding device and in particular the guide roller device thereof can absorb very large driver torso support forces if the guide roller device comprises two guide elements arranged above and at a distance from one another, one of the guide elements being positioned differently from the other guide element on the path of the displacement curve.

In other words, one guide element is arranged at least in part in a different position from the other guide element in the direction of the displacement curve.

In this context, the first guide element forms a first curved path and the second guide element forms a second curved path, said paths being arranged at least in part with a varying axial offset from one another. The two guide elements are thus arranged in a stationary manner with respect to one another with a varying axial offset. As a result, the two curved paths are arranged skewed with respect to one another at least in regions.

If the two guide elements, arranged side by side but at a distance, are arranged or respectively orientated with a progression of this type with respect to one another, an axial offset in relation to these two guide elements can be achieved in a constructionally particularly simple manner, meaning that the upper backrest part can be inclined about the displacement curve within the meaning of the invention during the lateral displacement.

A linear displacement of this type of the upper backrest part may for example be provided pneumatically or hydraulically using corresponding pneumatic or respectively hydraulic cylinder elements.

However, a mechanism of a particularly simple construction in relation to the guide roller device can be achieved if the displacement takes place manually, optionally still with the mechanical assistance of one or more spring elements.

So as to be able to ensure unusually good play compensation between the guide elements and the roller elements, it is advantageous if the guide roller device comprises a roller element arrangement for guiding a guide roller element having one or more locating bearing roller elements and having one or more floating bearing roller elements.

Herein, a roller element arrangement of this type may consist of virtually any number of roller elements positioned in virtually any manner with respect to one another, which interact with the respective guide element.

Roller element arrangements of this type are further explained hereinafter by way of example.

Very good guidance of the guide elements can be achieved in a constructionally simple manner if the guide roller device comprises a roller element arrangement for guiding a guide element having two locating bearing roller elements and at least one floating bearing roller element, or vice versa.

It has been found in practical tests that a guide element can be guided in a sufficiently play-free manner using two locating bearing roller elements and also a single floating bearing roller element, or using only one locating bearing roller element and two floating bearing roller elements.

A roller element arrangement having at least three roller elements per guide element is thus advantageous.

It will be appreciated that the floating bearing roller elements can be braced with respect to one or more locating bearing roller elements in various ways. The construction of the present linear guide device can advantageously be further reduced if two floating bearing roller elements are arranged braced with respect to at least one locating bearing rolling element by a shared spring element.

Herein, spring elements of various configurations are suitable for constructing suitable bracing of the floating bearing roller elements, wherein a leaf spring element for bracing the floating bearing roller elements has proved successful as a constructionally very simple variant.

It is further advantageous if the guide roller device comprises at least one roller element pair having a stationary roller element and having a roller element which is displaceable with respect to the stationary roller element.

Herein, the locating bearing roller element is a stationary but rotatable roller element, and the floating bearing roller element is a displaceable roller element. These terms can therefore be used synonymously herein.

In this context, the displaceable roller element is preferably mounted with spring bracing, in such a way that play-free guidance of the guide element can be ensured.

By means of a roller element pair of this type, a guide element can thus be guided in a particularly play-free manner between an initial position and an end position of the guide roller device within the meaning of the invention using the guide roller device.

The constructional complexity of the guide roller device can further be reduced if the guide roller device comprises at least one roller holding apparatus, on which the roller element arrangements and/or the roller element pairs of at least two guide paths at a distance from one another are mounted to guide at least two guide elements arranged side by side at a distance.

For example, the roller holding apparatus of the guide roller device is constructed in such a way that at least two roller element pairs are mounted at a distance from one another along the displacement axis.

The roller element arrangements may further advantageously be varied if the guide roller device comprises at least two guide paths at a distance from one another for guiding at least two guide elements arranged side by side and at a distance from one another, at least one roller element of one of the two guide paths at a distance from one another being orientated differently in the space from at least one roller element of another of the two guide paths arranged at a distance from one another in terms of the guide faces thereof.

For example, a first roller element or respectively a plurality of first roller elements are orientated vertically for guiding a first guide element in terms of the guide face or respectively guide faces, whilst a further roller element or a plurality of further roller elements are orientated substantially horizontally for guiding a further guide element in terms of the guide surfaces.

In this connection, it is advantageous if the axes of rotation of roller elements for guiding a first guide element and at least one axis of rotation of roller elements for guiding a further guide element are arranged orientated differently from one another in the space, in other words do not extend mutually parallel.

For example, the further guide element is merely guided using a single roller element, which is orientated differently from the first roller elements with respect to the first guide element.

It will be appreciated that different angles can be set between the axes of rotation which are orientated differently in the space. Preferably, these axes of rotation are arranged mutually perpendicular in the space.

In particular, these axes of rotation may also be arranged skewed with respect to one another.

It will be appreciated that, depending on the requirements placed on the guide roller device, sliding elements may additionally be used instead of individual roller elements so as to be able to achieve desired guidance properties or respectively guidance effects.

Ideally, in this context the displacement roller elements are thus replaced with corresponding displaceable sliding elements, since the sliding elements can be mounted in a constructionally less complex manner, in particular in terms of spring bracing, on the guide roller device or respectively in particular on the provided roller holding apparatus of the guide roller device.

In this respect, an alternative variant configuration provides that the guide roller device may also comprise floating bearing sliding elements instead of locating bearing sliding elements in addition or as an alternative to floating bearing roller elements.

It will be appreciated that corresponding guide elements may be provided in virtually any desired configuration and arrangement on the guide roller device.

Roller elements configured in a manner corresponding to the guide elements may also accordingly be provided in virtually any desired configuration and arrangement on the guide roller device.

The present guide roller device can be integrated into the vehicle seat in a particularly compact construction if the guide roller device comprises rod and/or tube guide elements which are arranged inside the upper backrest part.

Ideally, these rod and/or tube guide elements are fully integrated into the upper backrest part; however, with a corresponding configuration they may also be arranged only partially inside the upper backrest part.

In any case, the upper backrest part can be displaced along the displacement curve by means of these rod and/or tube guide elements, in such a way that the upper backrest part can be displaced at least in part into the torso support region which is otherwise free from vehicle seat.

Advantageously, the rod and/or tube guide elements are arranged inside the upper backrest part in such a way that they are displaced together with the upper backrest part so as to configure the displacement curve at least in part. As a result, it can be ensured that during displacement the rod and/or tube guide elements are displaced completely, together with the upper backrest part, into the torso support region which is otherwise free from vehicle seat, in such a way that a region free from components can be created on the vehicle seat above the lower backrest part, in the upper region of the backrest.

So as to be able to guide guide elements of this type reliably, it is advantageous if the guide roller device comprises roller elements which are arranged on the lower backrest part and on which rod and/or tube guide elements are guided transverse to the primary seating direction.

At this point, it should be noted that roller elements of this type need not necessarily be attached to the lower backrest part. Rather, with a corresponding configuration, they may also be arranged in other regions of the backrest or on a frame arranged alongside the vehicle sear or the like.

Advantageously, these roller elements are arranged in a stationary manner on the lower backrest part, in such a way that a particularly simple construction of a holding device configured or respectively equipped with the guide roller device can be implemented.

Further, an advantageous variant configuration provides that the guide roller device has a displacement curve which is bent at least once, preferably repeatedly.

For example, a displacement curve which is only bent once is already sufficient to displace the upper backrest part into a support position which is positioned below, above or behind the central parked position of the upper backrest part.

However, if the displacement curve is bent repeatedly, the upper backrest part can undergo a manifold change in spatial position along the displacement curve, making it possible for example to curve around obstacles or the like.

So as also for example to be able to circumvent any further obstacles which may be present on the path between the central parked position and the additional support position of the upper backrest part, it is thus advantageous if the guide roller device comprises a repeatedly bent displacement curve.

It will be appreciated that the present upper backrest part as a whole can only configure an upper sub-region of the backrest per se.

However, it is also possible for the upper backrest part merely to be a backrest cushion element which is linearly displaceable accordingly along a displacement curve by means of the guide roller device, laterally at least past a side edge of the lower backrest part, a frame or respectively framework of the backrest being stationary in particular with respect to the seat part, in such a way that merely the backrest cushion element is displaced from the central parked position into the off-centre additional support position.

In any case, in both embodiments the upper backrest part comprises backrest cushion elements by means of which the support surface described already above can be configured.

It is further possible for the upper backrest part additionally to be subdivided in the direction of the lateral extension thereof, in such a way that the backrest part is not displaced along the displacement curve as a whole, but only a first upper backrest part half, this first upper backrest part half being spatially separated from a second upper backrest part half of the upper backrest part by a vertical gap.

In any case, a variant configuration which is not less advantageous provides that the backrest parts which extend past the backrest are equipped with backrest cushion elements which are located in front of the backrest parts in the seating direction, a first backrest cushion element being a lower backrest cushion element which is stationary with respect to the seat part in the lateral direction, and a further backrest cushion element being arranged above the first backrest cushion element in the region of the upper backrest part, the upper backrest part being configured as an additional driver torso support device which can be arranged outside the seat part and the backrest, which can temporarily be arranged at least in part in a support region which is otherwise free from vehicle seat at the level of the region of the upper backrest part and laterally off-centre from the backrest, in such a way that the driver sitting on the vehicle seat is supported laterally off-centre from the backrest at least at the level of his shoulder and/or ribcage region during a laterally or rearwardly directed seated working posture, the additional driver torso support device being arranged displaceably from a central parked position into an additional support position in the support region which is otherwise free from vehicle seat by means of a displacement device.

In the present case, the displacement device is the guide roller device, as already mentioned previously.

The object of the invention is also further achieved by a utility motor vehicle, in particular by an agricultural utility motor vehicle, comprising at least one vehicle seat, in which the utility motor vehicle or respectively the agricultural utility motor vehicle is equipped with a vehicle seat in accordance with one of the features disclosed herein or respectively in accordance with one of the feature combinations disclosed herein.

If the utility motor vehicle, in particular the agricultural utility motor vehicle, comprises the vehicle seat according to the invention, additional torso support can be provided specifically for the driver during working operation, in particular when driving in fields or on other unsurfaced routes, meaning that the driver is much better protected, as is also described repeatedly in detail above.

Further advantages, aims and properties of the present invention are described by way of the appended drawings and the following description, in which a vehicle seat is illustrated and described by way of example using differently configured guide roller devices.

In this context, components or respectively regions of the vehicle seat which are configured with an equivalent construction in the individual drawings are denoted using like reference numerals, the components or respectively regions not necessarily being numbered and described in all of the drawings. Thus, only significantly altered components or respectively regions, in particular in terms of the possible guide roller devices shown by way of example, are provided with new reference numerals.

The guide roller device may be formed as a linear guide roller device and the displacement curve may be formed as a linear displacement axis.

BRIEF DESCRIPTION OF THE DRAWINGS

FIG. 3 is a first schematic detail of a first possible guide roller device of the upper backrest part in an initial position, in which two curved guide elements, arranged above and at a distance from one another, are mounted extending skewed with respect to one another at least in part on roller element holders;

FIG. 4 is a second schematic detail of the first possible guide roller device in a side position displaced laterally further out, in which the two guide elements already have a first axial offset at the level of the roller element holders;

FIG. 5 is a further schematic detail of the first possible guide roller device in a side position displaced laterally even further out, in which the two guide elements have a greater axial offset at the level of the roller element holders;

FIG. 6 is a final schematic detail of the first possible guide roller device in an end position, in which the two guide elements have a maximum axial offset at the level of the roller element holders;

FIG. 20 is a schematic view of a roller element arrangement having three roller elements at a mounting point for mounting a guide element;

FIG. 21 is a schematic view of another roller element arrangement having four cylinder roller elements at a mounting point for mounting a guide element;

FIG. 22 is a schematic view of a further roller element arrangement having three cylinder roller elements at a mounting point for mounting a guide element;

FIG. 23 is a schematic view of a further roller element arrangement having four cylinder roller elements at a mounting point for mounting a guide element made of a rod material;

FIG. 24 is a schematic view of an alternative roller element arrangement having four cylinder roller elements at a mounting point for mounting a U-shaped first guide element profile; and FIG. 25 is a schematic view of a further roller element arrangement having four cylinder roller elements at a mounting point for mounting a further U-shaped guide element profile.

DETAILED DESCRIPTION

Figure 1A:
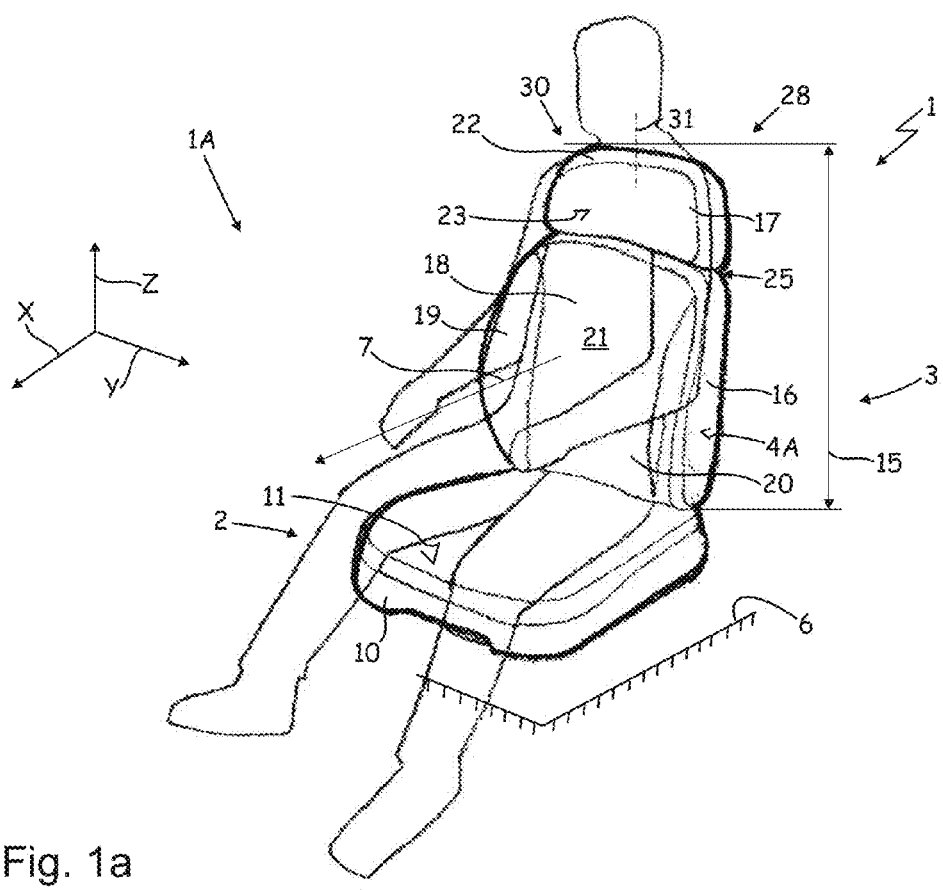
FIGS. 1a and 1b are schematic perspective views of a utility motor vehicle seat in a normal operating condition, in which the upper backrest part is arranged in a parked position centrally above the lower backrest part.
Figure 1B:
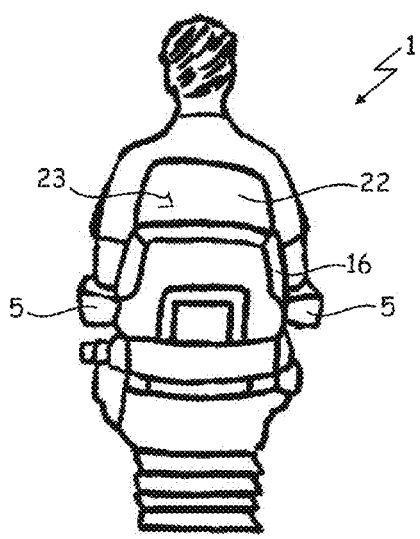

The vehicle seat 1 shown in FIGS. 1 to 8 is a utility motor vehicle seat 1A which comprises a seat part 2 and a backrest 3, an armrest 5 further being provided on the backrest 3 at the right side edge 4A.

The seat part 2 of the utility motor vehicle seat 1A is attached to a body (not shown) of a utility motor vehicle 6 by means of a lower vehicle seat part (not shown).

The utility motor vehicle 6 defines a vehicle longitudinal extension X, a vehicle lateral extension Y and a vehicle vertical extension Z, which may also be used in relation to the orientation of the utility vehicle seat 1A.

Thus, using the vehicle longitudinal extension X, a position or respectively change in position "in front of" or "behind" the backrest 3 can be defined.

With the aid of the vehicle lateral extension Y, a position or respectively change in position "laterally" or "to the side" with respect to the backrest 3 can be defined.

Accordingly, using the vehicle vertical extension Z, a position or change in position "upwards" or respectively "downwards" with respect to the backrest 3 can also be defined.

In this context, the utility motor vehicle seat 1A is arranged in the utility motor vehicle 6 in such a way that the primary seating direction 7 of the utility motor vehicle seat 1A is substantially flush with the vehicle longitudinal extension X.

The seat part 2 comprises a seat part cushion element 10 which configures the actual seat part surface 11 of the seat part 2.

The situation is similar as regards the backrest 3, the backrest 3 being subdivided over the overall height 15 thereof into a lower backrest part 16 and an upper backrest part 17. The overall height 15 extends substantially in the direction of the vehicle vertical extension Z.

In this context, the lower backrest part 16 comprises a lower part cushion element 18 having outer cheek regions 19 and 20, in such a way that the lower backrest part 16 as a whole configures a highly contoured lower part surface 21.

Accordingly, the upper backrest part 17 comprises an upper part cushion element 22, although this configures a smooth upper part surface 23.

The utility motor vehicle seat 1A further comprises a holding device 25 (see in particular FIG. 2 onwards), by means of which the upper backrest part 17 is mounted displaceably on the backrest 3 with respect to the lower backrest part 16.

In this context, the holding device 25 is releasably fixed in holding sockets (not shown) formed correspondingly in the lower backrest part 16 by way of holding bracket elements 25A and 25B (merely shown schematically), which are rigidly interconnected by a holding plate element 25C.

This holding device 25 configured in this manner comprises the guide roller device 26 according to the invention (see FIG. 3 onwards), which is configured in such a way that the upper backrest part 17 is linearly displaceable laterally along an imaginary displacement curve 27 past at least one side edge 4 of the lower backrest part 16 or respectively of the backrest 3, whilst the lower backrest part 16 is stationary with respect to the seat part 2.

The upper backrest part 17 thus forms the part of the backrest 3 which is laterally displaceable with respect to the seat part 2, whilst the lower backrest part 16 forms the part of the backrest 3 which is stationary with respect to the seat part 2.

Figure 2A:
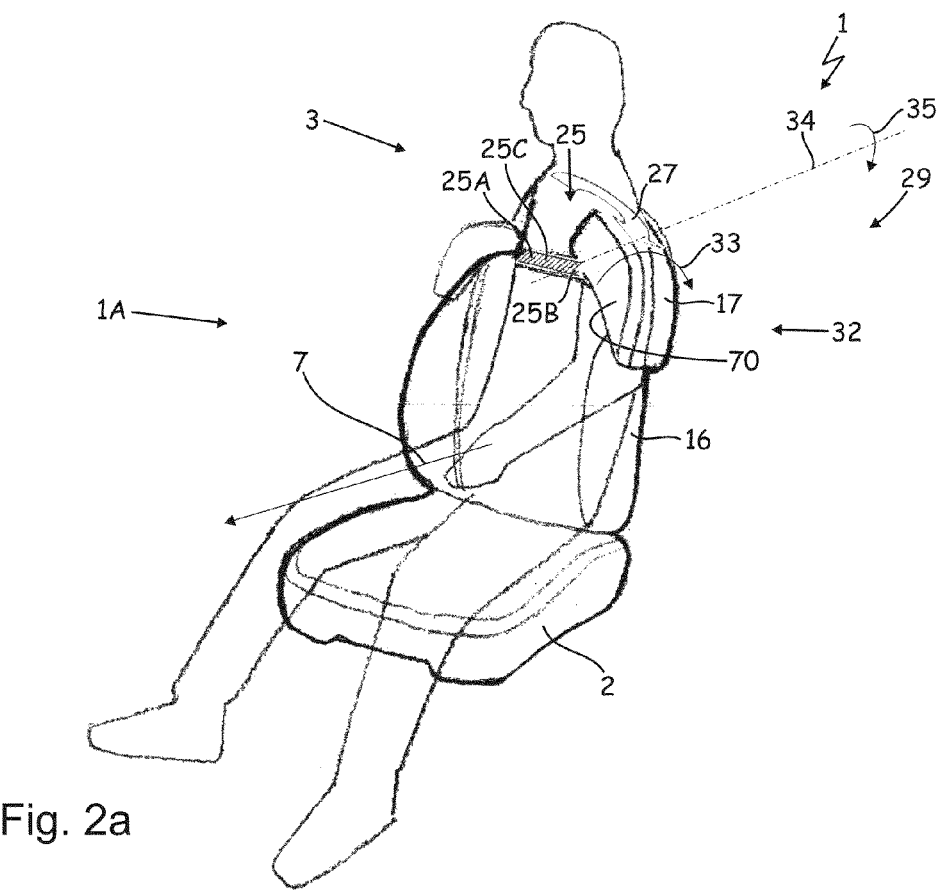
FIGS. 2a and 2b are further schematic views of the utility motor vehicle seat in a special support operating condition, in which the upper backrest part is arranged displaced laterally off-centre from the lower backrest part into a support position.
Figure 2B:
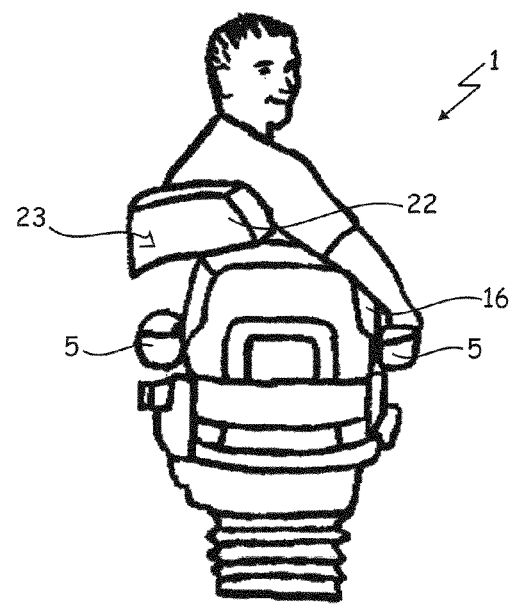

As a result, the upper backrest part 17 can be displaced or respectively slid from a central parked position 28 (see FIG. 1a, 1b, 3 and also 7) along the displacement curve 27 into an off-centre support position 29 (see FIG. 2a, 2b, 6 and also 8).

Since the overall height 15 extends in the direction of the vehicle vertical extension Z, it is clear that the upper backrest part 17 is positioned completely over the lower backrest part 16, in other words above the lower backrest part 16, at least in the central parked position 28, in such a way that the driver can comfortably take his place on the utility motor vehicle seat 1A in the primary seating direction 7 in this normal operating condition.

In this context, the imaginary displacement curve 27 extends transverse to the primary seating direction 7 or respectively to the vehicle longitudinal extension X. The imaginary displacement curve 27 thus extends substantially in the vehicle lateral extension Y.

In the central parked position 28 of the upper backrest part 17, the guide roller device 26 or respectively corresponding components thereof are located in an initial position 30 (see also FIG. 3 and respectively 7).

This central parked position 28 and respectively this initial position 30 are defined in that, on the one hand, the upper backrest part 17 and respectively, on the other hand, the guide roller device 26 are located centrally with respect to a vertical central axis 31 of the backrest 3. The vertical central axis 31 extends substantially in the direction of the vehicle vertical extension Z. The central parked position 28 is thus located centrally between the two side edges 4A and 4B.

With respect to the off-centre support position 29 of the upper backrest part 17, the guide roller device 26 is located in a laterally off-centre end position 32 (see in particular FIGS. 2a, 2b and 6), this laterally off-centre end position 32 being located to the right side of the vertical central axis 31 and thus also at least in part to the right side of the right side wall 4A of the lower backrest part 16.

It will be appreciated that for a guide roller device 26 configured in this manner the laterally off-centre end position 32 may also be arranged to the left side of the vertical central axis 31 and thus also at least in part to the left side of the left side wall 4B of the lower backrest part 16.

In this embodiment, the guide roller device 26 is accommodated completely inside the upper backrest part 17 or respectively is covered at least in part by the upper backrest part 17, so it is also not explicitly shown in the drawings of FIGS. 1a, 1b and 2a, 2b.

By means of the guide roller device 26 according to the invention, the upper backrest part 17 can not only be displaced linearly past the right side edge 4A of the lower backrest part 16, but can further also be inclined rearwards with respect to the backrest 3 or respectively downwards with respect to the backrest 3 when the upper backrest part 17 is displaced along the imaginary displacement curve 27.

In this respect, the upper backrest part 17 can thus additionally be rotated about the imaginary displacement curve 27 in a first inclination direction 33 and/or rotated in a second inclination direction 35 about a transverse axis 34 extending in a transverse manner to the displacement curve 27 during the lateral displacement.

So as to implement a multiply inclined change in position of the upper backrest part 17 of this type in a constructionally simple manner, in such a way that the guide roller device 26 can be integrated compactly and ideally completely into the upper backrest part 17, the guide roller device 26 is configured helically at least in part.

In this specific first embodiment, the effect of a helically configured guide roller device 26 is achieved in a constructionally simple manner in that the guide roller device 26 comprises two guide elements 36 and 37, arranged side by side and at a distance from one another, in the form of tube elements 38 (here numbered merely by way of example), the two guide elements 36 and 37 being arranged skewed with respect to one another at least in part if they do not extend mutually parallel in regions.

In other words, one of the guide elements 36 and respectively 37 is arranged differently in the path of the imaginary displacement curve 27 with respect to the other of the guide elements 36 and respectively 37 inside a housing element 26A of the guide roller device 26 (see in particular FIG. 3 onwards).

In this embodiment, the two guide elements 36 and 37 are thus arranged mutually parallel at a first end 26B of the guide roller device 26, whilst they are arranged extending skewed with respect to one another towards a second end 26C, as can be seen particularly clearly in the individual sectional drawings 39 of the respective upper partial drawings of FIGS. 3 to 6.

In this context, the two guide elements 36 and 37 define the imaginary displacement curve 27 which herein is imagined to extend between the two guide elements 36 and 37.

In this context, the guide elements 36 and 37 are configured in a curved manner in such a way that the imaginary displacement curve 27 is curved once, meaning that the upper backrest part 17 follows a curved path when it is displaced along the imaginary displacement curve 27 which is bent once.

As well as the two guide elements 36 and 37, the guide roller device 26 also comprises a holding device 40, which is attached to the holding device 25 of the utility motor vehicle seat 1A.

More precisely, this holding device 40 is attached to the holding plate element 25C so as to be stationary.

Figure 9:
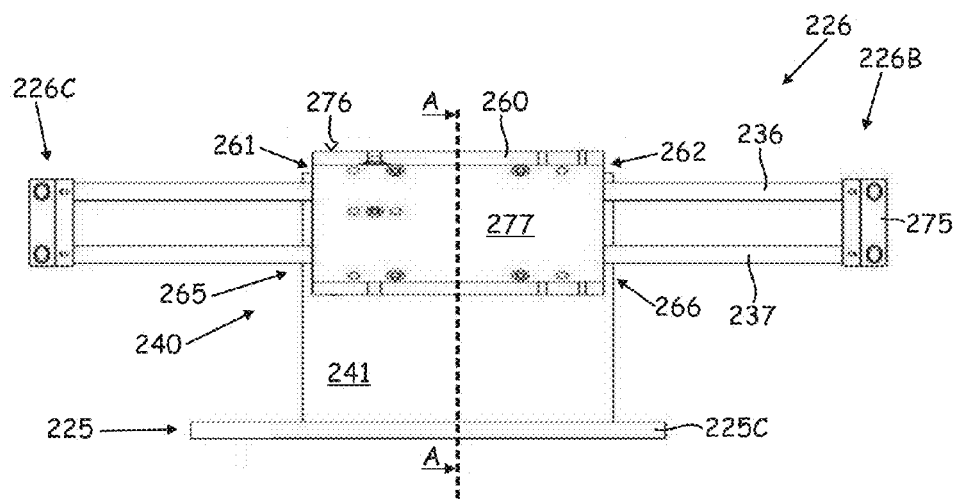
FIG. 9 is a schematic front view of a third possible guide roller device comprising a roller apparatus mounting four roller element pairs.
Figure 10:
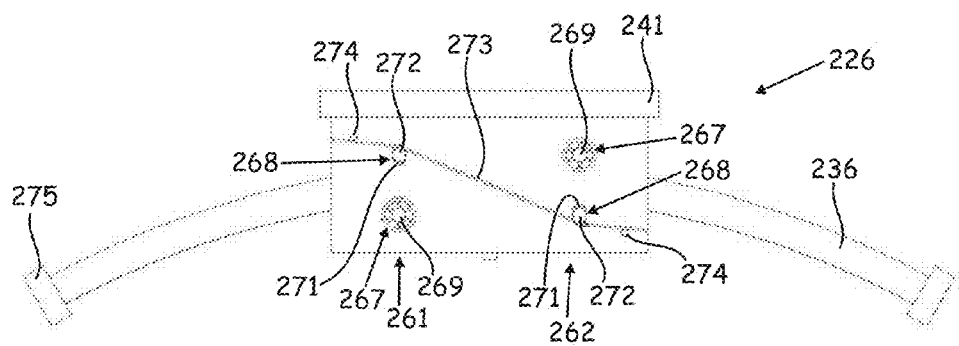
FIG. 10 is a schematic plan view in particular of the roller apparatus of FIG. 9.

In this embodiment, this holding device 40 consists of a holding sheet metal element 41 configured in a delta shape, to which three roller element holders 42, 43 and 44 for mounting roller elements are attached in turn (see for example FIGS. 9 and 10).

In this context, the holding sheet metal element 41 configured in a delta shape is materially connected, preferably welded, to the holding plate element 25C. An equivalent connection may also alternatively be based on a screw or rivet connection or the like.

In this embodiment, the holding device 40 is thus rigidly connected to the holding device 25. Likewise, the three roller element holders 42, 43 and 44 are fixed to the holding sheet metal element 41 of the holding device 40 so as to be stationary. Overall, this results in robust and durable attachment of the upper backrest part 17 with respect to the lower backrest part 16.

By means of the holding sheet metal element 41 configured in a delta shape, the holding device 40 can be constructed more compactly as a whole, and it is further possible for the first guide element 36 merely to be able to be displaced only on the first roller element holder 42 and for the second guide element 37 to be able to be displaced both on the second roller element holder 43 and on the third roller element holder 44, rolling along the imaginary displacement curve 27 in the displacement direction 45 in accordance with the invention.

Advantageously, these roller element holders 42, 43 and 44 are configured in such a way that they are arranged on the lower backrest part 16 by means of the holding sheet metal element 41 of the holding device 40 and the holding device 25 on the lower backrest part 16, and on which the guide elements 36 and 37 configured as tube elements are simultaneously guided transverse to the primary seating direction 7 in the direction of the imaginary displacement curve 27.

In FIG. 3, the guide roller device 26 is still located in the initial position 30 (cf. FIG. 1a, 1b), in which the upper backrest part 17 is located in the central parked position 28. As can be seen particularly clearly from the upper sectional drawing 39 of FIG. 3 at the height of the holding device 40, the two guide elements 36 and 37 are arranged mutually parallel jointly centrally together in a vertical plane 50 in the region of the first end 26B of the guide roller device 26. The upper backrest part 17 is thus not yet arranged inclined rearwards or downwards within the meaning of the invention.

However, in the further progression of the two guide elements 36 and 37 towards the second end 26C of the guide roller device 26, the first guide element 46 is already no longer arranged centrally in the shared vertical plane 50 together with the second guide element 37, but is instead arranged centrally in a vertical parallel plane 51, in such a way that there is a first axial offset 52 between the two guide elements 36 and 37, as can be seen particularly clearly from the upper sectional drawing 39 of FIG. 4 at the holding means 40.

Since the two guide elements 36 and 37 are installed fixedly in the housing element 26A, this has the effect that the upper backrest part 17 is inclined rearwards at a first angle of inclination 53 in the first inclination direction 33 (see FIG. 2a, 2b) when the upper backrest part 17 is moved laterally along the imaginary displacement curve 27 in the displacement direction 45 (cf. FIG. 4). At the same time, in this first intermediate position 54, the upper backrest part 17 is inclined downwards in the second inclination direction 35 about the transverse axis 34 as a result of the somewhat obliquely arranged holding device 40 and the curvature of the guide elements 36 and 37 (see also FIG. 2a, 2b).

This effect is reinforced as the upper backrest part 17 is moved further towards the off-centre support position 29 thereof or respectively the guide roller device 26 is moved into the end position 32 thereof (see FIG. 6), since the axial offset between the two guide elements 36 and 37 constantly increases during the progression towards the second end 26C, as is illustrated particularly clearly for example in FIG. 5 with a relatively large axial offset 55.

Accordingly, in this second intermediate position 56, the first angle of inclination 53 also increases to a larger angle of inclination 57 (see sectional drawing 39, FIG. 5) and this continues until the two guide elements 36 and 37 are displaced through the corresponding roller element holders 42, 43 and 44 to the second end 26C thereof in the displacement direction 45 and the guide roller device 26 is finally located in the end position 32 thereof and respectively the upper backrest part 17 is finally located in the off-centre support position 29 thereof.

In this end position 32, a maximum axial offset 58 and accordingly a maximum angle of inclination 59 can thus be made use of so as to be able to use the upper backrest part 17 completely as an additional support surface, as a maximally slid-out and correspondingly positioned driver torso support device 70.

As soon as it has been displaced into the off-centre support position 29 thereof (cf. FIGS. 2a, 2b and 6), the upper backrest part 17 can thus also act completely as an additional driver torso support device 70, correspondingly increasing the seat comfort of the driver.

Figure 8:
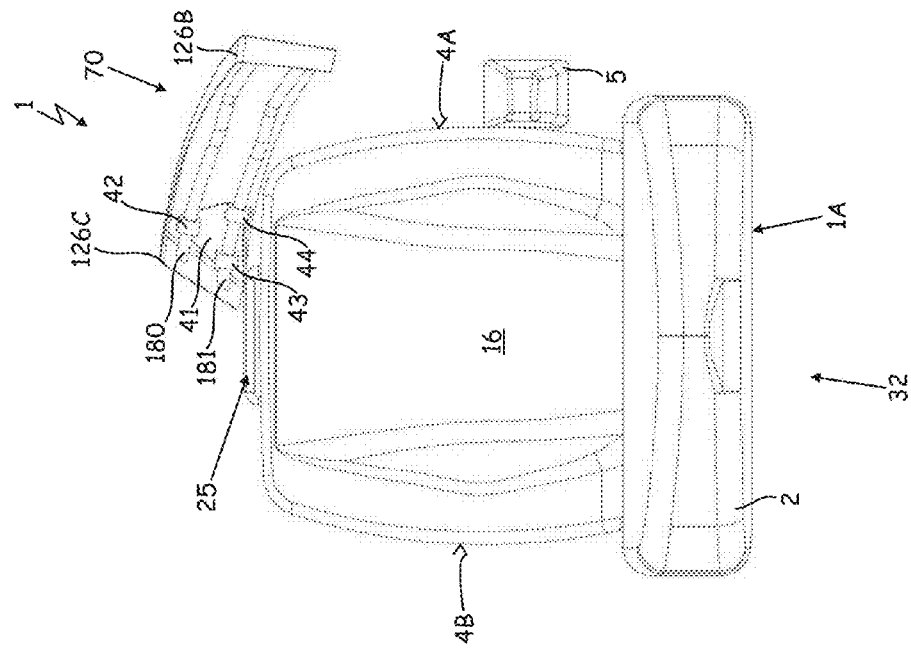
FIG. 8 is a further schematic detail of the guide roller device of FIG. 7 in an end position in which the upper backrest part is located in a support position.
Figure 7:
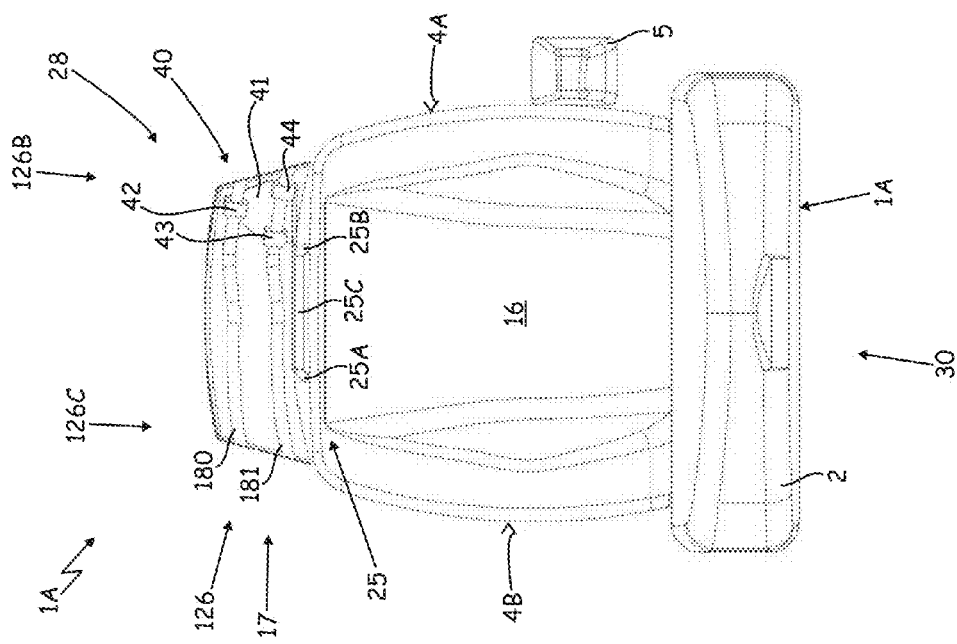
FIG. 7 is a schematic detail of a second possible guide roller device of the upper backrest part in an initial position, in which two guide elements, arranged above and at a distance from one another and extending skewed with respect to one another at least in part, are curved repeatedly.

Whereas in relation to the first embodiment the two guide elements 36 and 37 still have a single curvature in the form of tube elements 28 in relation to the first guide roller device 26 shown in detail in FIGS. 3 to 6, in this further embodiment corresponding round rod elements 180 and 181 of an alternative guide roller device 126 shown in FIGS. 7 and 8 are multiply curved, in such a way that the upper backrest part 17 can follow a multiply curved imaginary displacement curve (not explicitly shown here). As a result, it is advantageously optionally possible for the upper backrest part 17 also to circumvent obstacles (not shown) during displacement between the central parked position 28 (see FIG. 7) and the off-centre support position 29 (see FIG. 8).

Otherwise, the utility motor vehicle seat 1A shown in FIGS. 7 and 8 corresponds to the construction described previously in FIGS. 1 and 6, and so reference is made to the relevant description for the avoidance of repetition.

Figure 11:
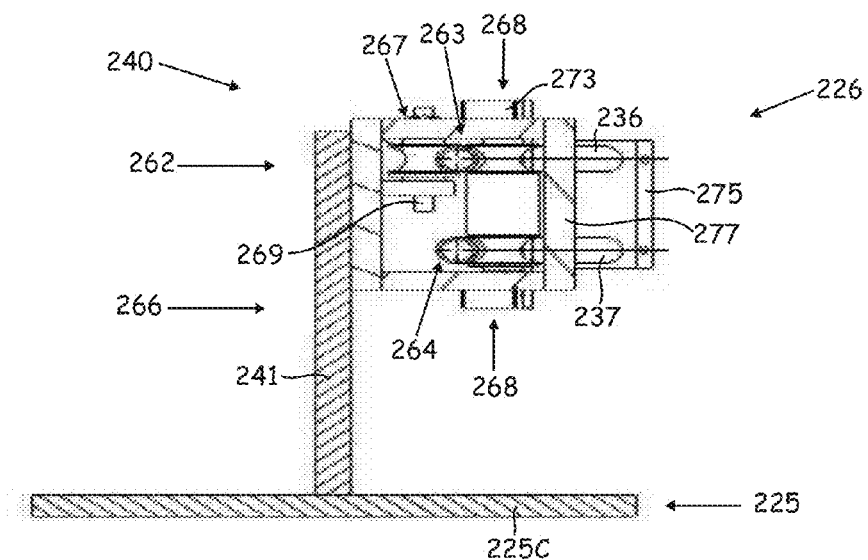
FIG. 11 is a schematic sectional side view in particular of the roller apparatus of FIG. 9 along the section line A-A of FIG. 9.

In relation to the third embodiment shown in FIGS. 9 to 11, a third possible guide roller device comprises a roller apparatus 260, on which are mounted two roller elements pairs 261 and 262 for defining a first guide path 263 for a first guide element 236 and a third roller element pair 265 and a fourth roller element pair 266 for defining a second guide path 264 for a second guide element 237.

The roller holding apparatus 260 is a component of a holding device 240, the roller holding apparatus 260 being attached by means of a holding sheet metal element 241 to a holding plate element 225C of a holding device 225 (not shown in greater detail) of the utility motor vehicle 1A (see in particular FIGS. 1*a*, 1*b* and 2*a*, 2*b*).

In this third embodiment, each of the roller element pairs 261, 262, 265 and 266 always consists of a locating bearing roller element 267 and a floating bearing roller element 268, the locating bearing roller element 267 being mounted stationary but rotatable in the roller holding apparatus 260 and the floating bearing roller element 268 being correspondingly mounted displaceably with respect to this stationary roller element 267 in the roller holder apparatus 260.

Accordingly, it is also possible to refer synonymously to a stationary roller element 267 in relation to the locating bearing roller element 267 and to a displaceable roller element 268 in relation to the floating bearing roller element 268.

Whereas the stationary bearing roller elements 267 thus comprise an axis of rotation 269 which is stationary in the roller holding apparatus 260, the floating bearing roller elements 268 each have a displaceable axis of rotation 272 positioned in a slot 271.

The respective slots 271 are formed in the roller holding apparatus 260 in such a way that the floating bearing roller elements 268 can be moved with respect to the respectively associated locating bearing roller element 267 in such a way that the respective guide element 236 or respectively 237 can still be guided without play on the roller element pairs 261, 262 and 265, 266.

For this purpose, the floating bearing roller elements 268 are accordingly spring-braced, specifically by means of a single leaf spring element 273, the single leaf spring element 273 being arranged braced with respect to two tension webs 274 and the displaceable axis of rotation elements 272.

The first guide element 236 and the second guide element 237 are rigidly interconnected at the first end 226B and at the second end 226C of the third possible guide roller device 226, in each case by means of a flange element 275 (numbered merely by way of example), the upper backrest part 17 being screwed to these flange elements 275 (see in particular FIGS. 1*a*, 1*b* and 2*a*, 2*b*) and thus being rigidly connected to the two guide elements 236 and 237.

The roller holding apparatus 260 is further characterized by a robust housing 276, which is screwed together from individual solid plate elements 277 (numbered merely by way of example).

Figure 12:
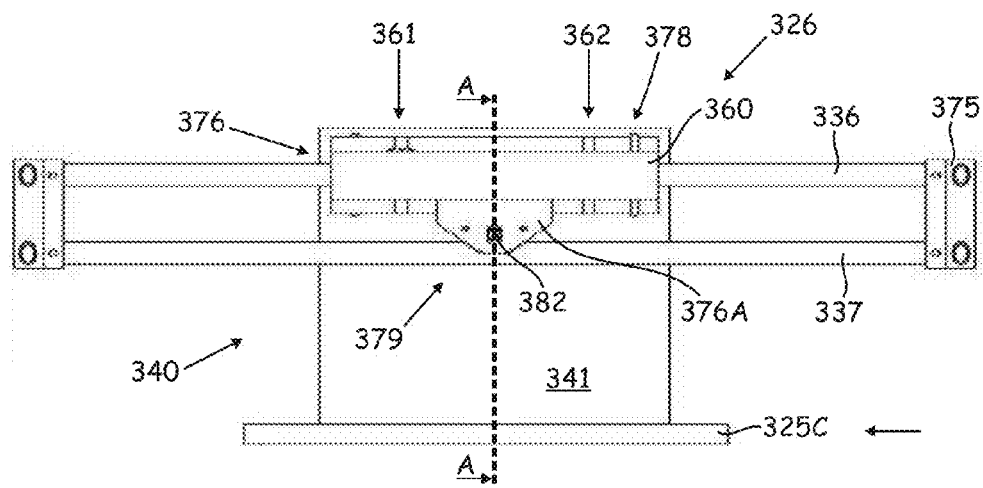
FIG. 12 is a schematic front view of a fourth possible guide roller device comprising a roller apparatus mounting two roller element pairs and a single roller element.
Figure 13:
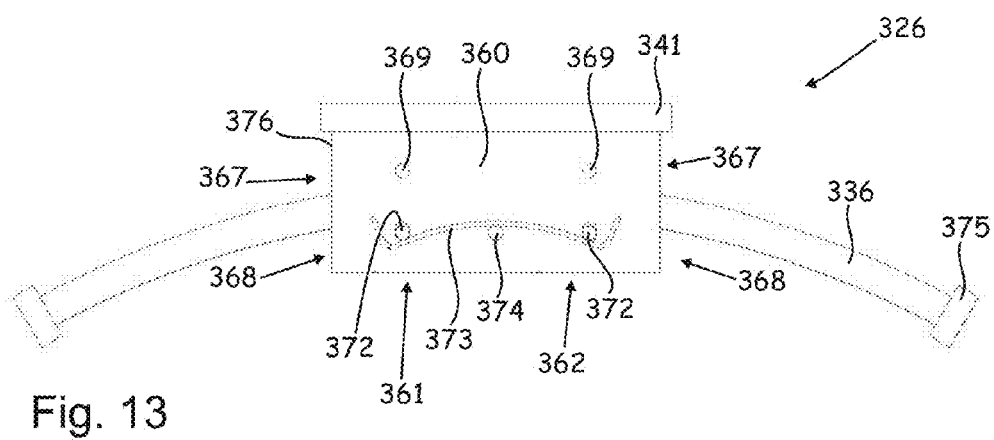
FIG. 13 is a schematic plan view in particular of the roller apparatus of FIG. 12.
Figure 14:
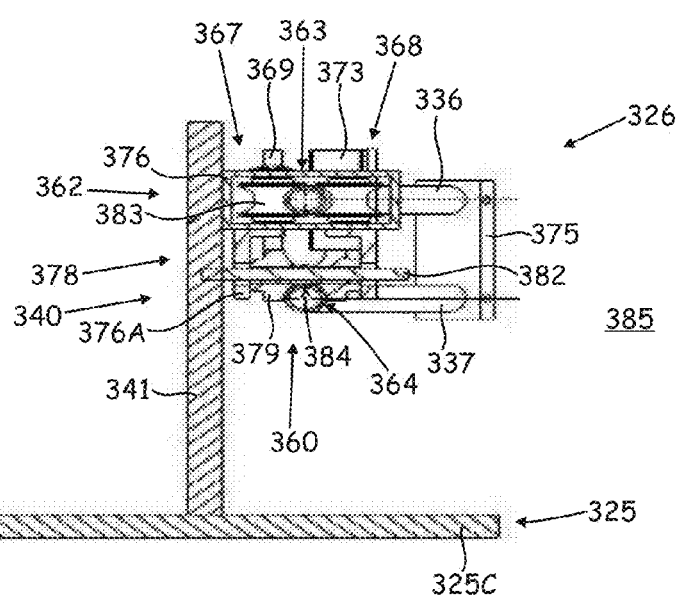
FIG. 14 is a schematic sectional side view in particular of the roller apparatus of FIGS. 12 and 13 along the section line A-A of FIG. 12.

The fourth embodiment shown in FIG. 12 of a fourth possible guide roller device 326 comprises an alternative roller holding apparatus 360, which is in turn flanged to a holding sheet metal element 341 of a holding device 340, this holding sheet metal element 341 being arranged on a holding plate element 325C of a holding device 325 (not shown in greater detail).

The fourth possible guide roller device 326 further in turn comprises a first guide element 336 and a second guide element 337, which are rigidly interconnected at the respective ends thereof by means of flange elements 375.

These guide elements 336 and 337 are guided rolling linearly on the roller holding apparatus 260 by means of a roller element arrangement 378.

In this fourth embodiment, the roller element arrangement 378 consists of two roller element pairs 361 and 362, by means of which the first guide element 336 is guided on the guide roller device 326.

By contrast, the second guide element 337 is merely guided on the roller holding apparatus 360 by means of a single roller element 379.

The two roller element pairs 361 and 362 are each composed of a locating bearing roller element 367 and a floating bearing roller element 368, the relevant stationary roller element being rotatably fixed to a fixed axis of rotation element 369 in the housing 367 of the roller holding apparatus 360. However, the two corresponding displaceable roller elements are each mounted displaceably along a slot 371 by means of displaceable axis of rotation elements 372 in the housing 376.

In this fourth embodiment too, spring bracing of the two floating bearing roller elements 268 of the roller element pairs 361 and 362 is again provided by way of a single leaf spring element 373, which is arranged braced between a tension web element 374 and the two displaceable axis of rotation elements 372.

In this context, the tension web element 374 is spatially arranged between the two displaceable axis of rotation elements 372 in such a way that the single leaf spring element 373 can be biased accordingly via these three points.

The single roller element 379 is fixed in a lower housing part 376A of the housing 376 by means of a further stationary but rotatable axis of rotation element 382.

In this context, the further stationary axis of rotation element 382 is arranged perpendicularly to the stationary axis of rotation elements 369, but also to the displaceable axis of rotation elements 372, meaning that guide faces 383 which configure the first guide path 363 and a further guide face 384 which configures the second guide path 364 are arranged or respectively orientated differently from one another in the space 385.

Figure 15:
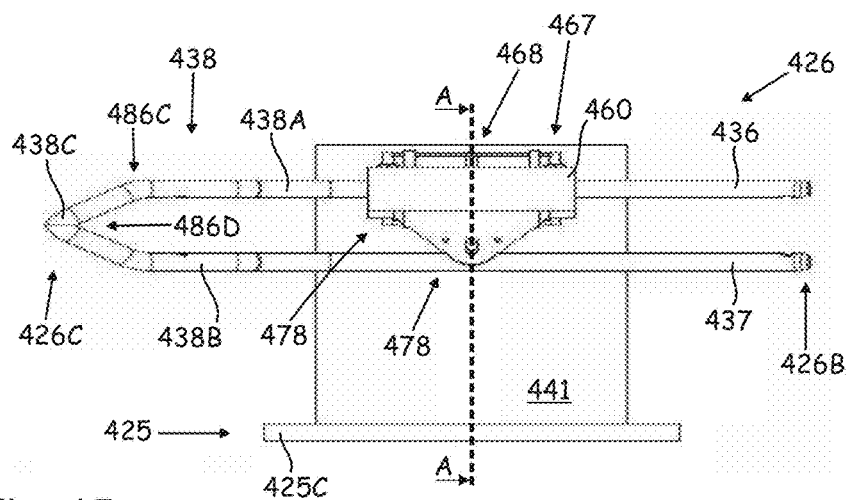
FIG. 15 is a schematic front view of a fifth possible guide roller device having a roller apparatus comprising a roller element arrangement consisting of two stationary roller elements and a roller element displaceable with respect thereto, as well as a differently orientated single roller element.
Figure 16:
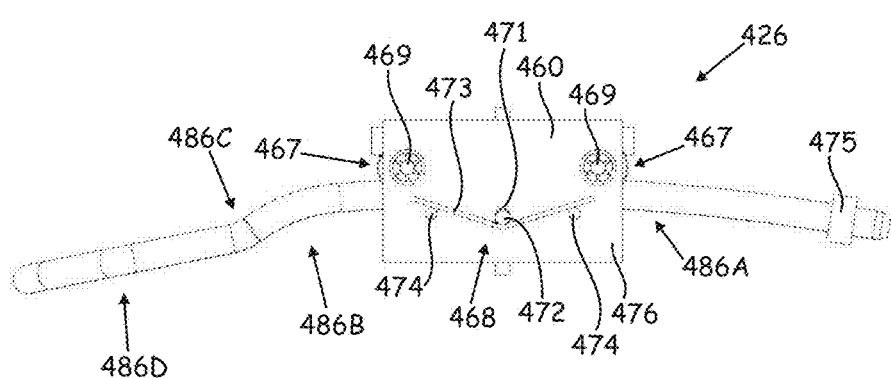
FIG. 16 is a schematic plan view in particular of the roller apparatus of FIG. 15.
Figure 17:
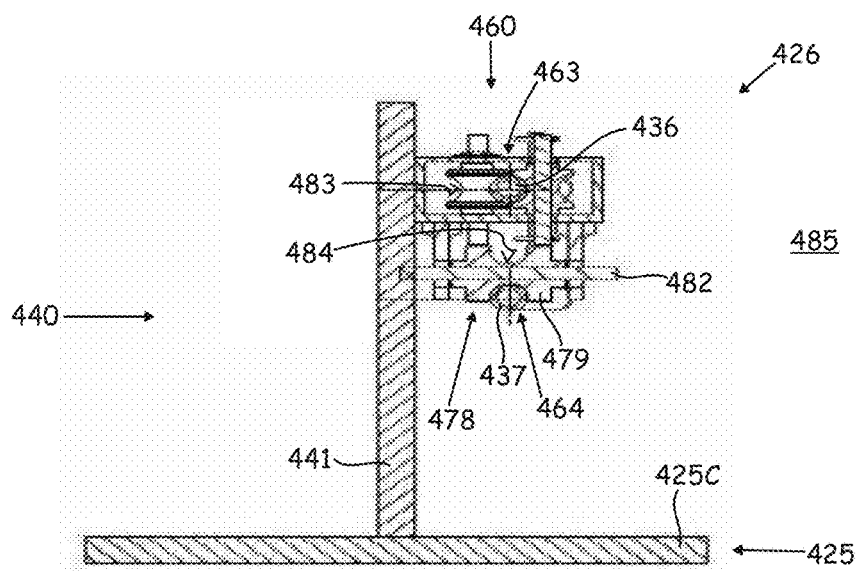
FIG. 17 is a schematic sectional side view in particular of the roller apparatus of FIGS. 15 and 16 along the section line A-A of FIG. 15.

The fifth embodiment shown in FIGS. 15 to 17 illustrates a fifth possible guide roller device 426 comprising a differently configured roller holding apparatus 460, this roller holding apparatus 460 mounting an alternative roller element arrangement 478, which consists of two locating bearing roller elements 467 and a floating bearing roller element 468 on the one hand and a single roller element 479 on the other hand.

The roller holding apparatus 460 is flanged to a holding sheet metal element 441 of a holding device 440 of the linear roller guide device 426. This holding device 440 is in turn arranged on a holding plate element 425C of a holding device 425, it being possible to attach this holding device 425 directly to the lower backrest part 16 of the backrest 3

(see FIGS. 1a, 1b and 2a, 2b), as described repeatedly above in relation to the other embodiments.

In this context, the two locating bearing roller elements 467 and the floating bearing roller element 468 form a first guide path 463 for a first guide element 436. To this effect, a second guide path 464 for a second guide element 437 is merely formed by the single roller element 478, meaning that the guide roller device is of a more slender construction as a whole.

In this fifth embodiment, the two guide elements 436 and 437 are formed as a U-shaped tube element 438, the two tube element limbs 438A and 438B of which are unreleasably interconnected in the region of the second end 426C of the linear roller guide device 426 in a tip 438C formed in a U shape.

At the first end 426B of the linear roller guide device 426, the two tube element limbs 438A and 438B of the U-shaped tube element 438 are in turn rigidly but releasably interconnected using a flange element (not shown) (see for example FIGS. 9 and 12).

In this embodiment, the U-shaped tube element 438 is additionally repeatedly bent, and accordingly has respectively a first curvature portion 486A, a second curvature portion 486B, a third curvature portion 486C on the two tube element limbs 438A and 438B and also a fourth curvature portion 486D at the tip 438C thereof.

It will be appreciated that curvature portions 486A, B, C of this type may also be provided on guide elements 436 and 437 which are not interconnected by a tip 438C (cf. FIGS. 7 and 8).

In particular by way of the first three curvature portions 486A, 486B and 486C, which are present on the two tube element limbs 438A and 438B, it is possible to displace the upper backrest part 17 (see in particular FIGS. 1a, 1b and 2a, 2b) along a repeatedly bent or respectively curved displacement curve 27 in such a way that in this context also other elements or respectively components which are located alongside the backrest 3 can also be circumvented while the upper backrest part 17 is being displaced from the central parked position 28 thereof into the off-centre support position 29 thereof, or vice versa.

In this context, the first tube element limb 438A is mounted by the two locating bearing roller elements 467 and by the floating bearing roller element 468, whilst the second roller element limb 438B is merely guided or respectively mounted by the single roller element 479.

The two locating bearing roller elements 467 are each rotatably fixed using an axis of rotation element 469 fixed in a housing 467 of the roller holding apparatus 460. In this context, the floating bearing roller element 468 is mounted in a slot 471 by means of a displaceable axis of rotation element 472 in the housing 467, the displaceable axis of rotation element 472 being braced by means of a leaf spring element 473. For this purpose, the leaf spring element is correspondingly gripped between the displaceable axis of rotation element 472 and two tension web elements 474 positioned to the side thereof.

The two tube element limbs 438A and 438B are interconnected rigidly but releasably at the second end 426B of the linear roller guide device 426 by means of a flange element 475 (see FIG. 16).

As can be seen clearly from FIG. 17, the stationary axis of rotation elements 469 and the displaceable axis of rotation element 472 are arranged orientated differently in the space 485 than a further stationary axis of rotation element 482 of the single roller element 479. In particular, it can clearly be seen from FIG. 17 that the further stationary axis of rotation element 482 is orientated perpendicularly to the other axis of rotation elements 469 and 472. As a result, the first guide surfaces 483 defined by the locating bearing roller elements and the floating bearing roller element 468 are likewise arranged orientated differently from a further guide face 484 defined by the individual roller element 479 on the linear roller guide device 426 in the space 485.

Figure 18:
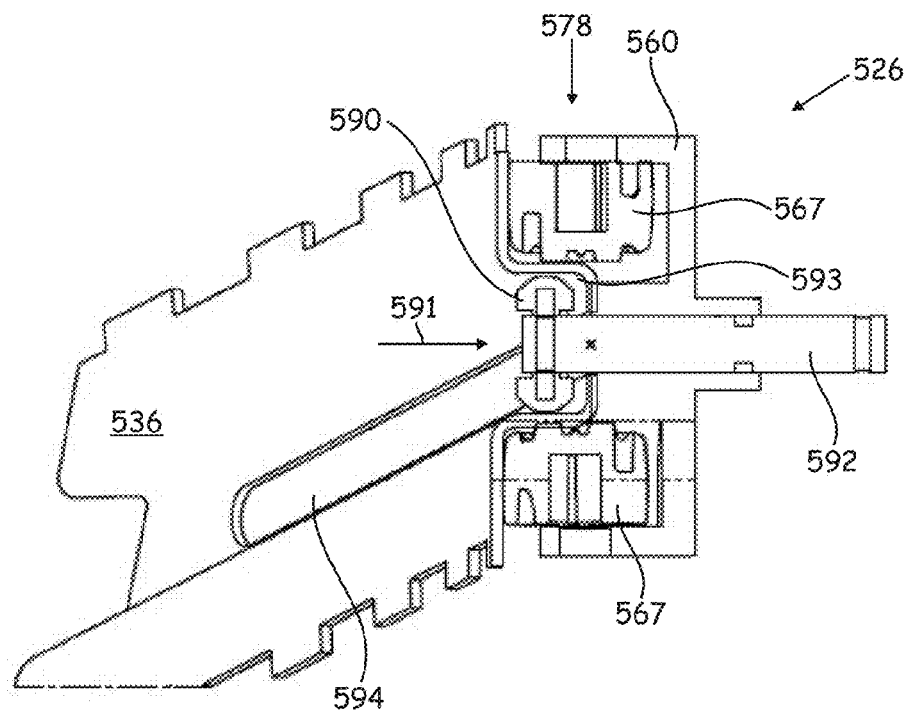
FIG. 18 is a schematic perspective view of a sixth possible guide roller device having guide elements guided by roller and sliding elements.
Figure 19:
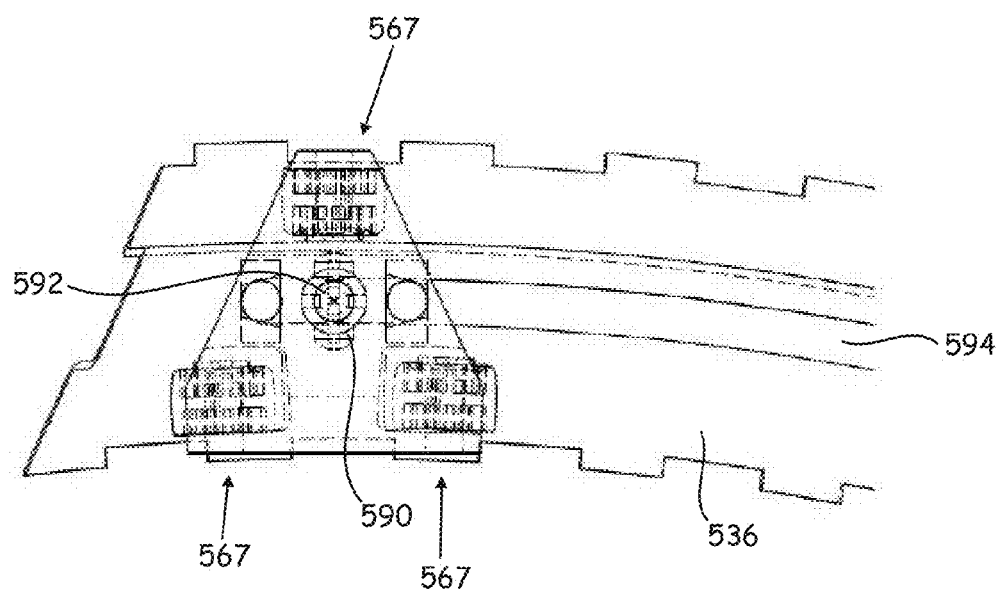
FIG. 19 is a schematic plan view of the sixth possible guide roller device of FIG. 18.

In the sixth embodiment shown in FIGS. 18 and 19, play compensation between a roller element arrangement 578 and a guide element 536 of a sixth possible linear roller guide device 526 is implemented by means of an additional sliding element 590, by means of which the guide element 536 is constantly pressed against the locating bearing roller elements 567 of the roller element arrangement 578 in a press-on direction 511.

In this context, the locating bearing roller elements 567 are mounted in a roller holding apparatus 560 of the linear roller guide device 526. Likewise, the additional sliding element 590 is mounted spring-loaded in this roller holding apparatus 560, for which purpose the additional sliding element 590 is arranged on a movable retraction pin element 592. The retraction spring element 592 which braces the entire retraction pin element 592 in the press-on direction 591 is not shown here.

In this fifth possible linear roller guide device 526, the guide element 536 consists of a sheet metal construction comprising a sliding groove 593 in which the additional sliding element 590 is arranged. The guide element 536 also further comprises an elongate material recess 594, which extends in the longitudinal extension of the guide element 536. The retraction pin element 592 is guided through the guide element 536 by way of this elongate material recess 594, in such a way that the additional sliding element 590 can be positioned and mounted in the sliding groove 593 from the direction of the roller holding apparatus 560 through the guide element 536.

FIGS. 20 to 25 show a further plurality of possible guide element geometries as well as possible roller element geometries and arrangements and the number of installed roller elements.

The guide element 636 shown in FIG. 20 is a circular rod of a solid material. This guide element 636 is guided by means of a roller element arrangement 678 of three identical concavely formed roller elements (not numbered separately).

In case of the guide element 736 shown in FIG. 21 consisting of a solid material circular rod, a different roller element arrangement 778 of a total of four spherical roller elements (not numbered separately) is shown, the four spherical roller elements being arranged concentrically around the guide element 736. In this context, two of the four spherical roller elements form a first roller element pair 761 and have a larger diameter than the other two of the four spherical roller elements, the spherical roller elements having the same diameter being arranged opposite one another. The other two spherical roller elements form the second roller element pair 762.

In the embodiment according to FIG. 22, a guide element 836 again consists of a circular rod solid material, this guide element 836 being mounted and guided using three spherical roller elements (not numbered separately). The three spherical roller elements are arranged concentrically around the round guide element 836, and all have an identical diameter. The guide element 836 is thus guided and mounted by a roller element arrangement 878 consisting of three identical spherical roller elements.

The guide element 936 shown in FIG. 23 is a rectangular solid material rod, which is mounted by means of a roller element arrangement 978 consisting of two roller element pairs 961 and 962 having a total of four spherical roller elements (not numbered separately). In this context, two of the four spherical roller elements again have an identical diameter, these two spherical roller elements in each case being positioned opposite to one another as a roller element pair 961 or respectively 962.

The guide element 1036 shown in FIG. 24 is configured in a U shape and mounted and guided by means of a different roller element arrangement 1078 of two roller element pairs 1061 and 1062, this roller element arrangement 1078 in turn comprising four spherical roller elements (not numbered separately). In this context, two of the four spherical roller elements are identical (roller element pair 1061) and two of the four spherical roller elements are further of a different construction (roller element pair 1062), one of the different spherical roller elements being arranged inside the guide element 1036 and accordingly being enclosed at least in part by three limbs of the guide element 1036, meaning that this roller element arrangement 1078 is of a very compact construction.

In the embodiment shown in FIG. 25, the guide element 1136 is again configured in a U shape; however, the spherical roller elements of this roller element arrangement 1178 are arranged distributed completely peripherally on the guide element. In this context, the roller element arrangement 1178 again consists of two roller element pairs 1161 and 1162, the individual spherical roller elements of the respective roller element pair 1161 or respectively 1162 being configured identically.

It will be appreciated that the embodiments described above are merely first configurations of the vehicle seat according to the invention or respectively of guide roller devices and the components thereof. The configuration of the invention is therefore not limited to these embodiments.

All of the features disclosed in the application documents are claimed as being essential to the invention if they are novel with respect to the prior art individually or in combination.

LIST OF REFERENCE NUMERALS 1 vehicle seat
1A utility vehicle seat
2 seat part
3 backrest
4 right side edge
5 armrest
6 utility motor vehicle
7 primary seating direction
10 seat part cushion element
11 seat part surface
45 overall height
16 lower backrest part
17 upper backrest part
18 lower part cushion element
19 first outer cheek region
20 second outer cheek region
21 contoured lower part surface
22 upper part cushion element
23 smooth surface
25 holding device
25A first holding bracket element
25B second holding bracket element
25C holding plate element
26 guide roller device
26A housing element
26B first end
26C second end
27 imaginary displacement curve
28 central parked position
29 off-centre support position
30 initial position
31 vertical central axis
32 end position
33 first inclination direction
34 transverse axis
35 second inclination direction
36 first guide element
37 second guide element
38 tube element
39 sectional drawings
40 holding device
41 holding sheet metal element
42 first roller element holder
43 second roller element holder
44 third roller element holder
45 displacement direction
50 shared vertical plane
51 vertical parallel plane
52 first axial offset
53 first angle of inclination
54 first intermediate position
55 larger axial offset
56 second intermediate position
57 larger angle of inclination
58 maximum axial offset
59 maximum angle of inclination
70 vehicle driver torso support device
126 second possible linear guide device
126B first end
126C second end
180 first circular rod element
181 second circular rod element
226 third possible linear guide device
226B first end
226C second end
225 holding device
225C holding plate element
236 first guide element
237 second guide element
240 holding device
241 holding sheet metal element
260 roller holding apparatus
261 first roller element pair
262 second roller element pair
263 first guide path
264 second guide path
265 third roller element pair
266 fourth roller element pair
267 locating bearing roller element
268 floating bearing roller element
269 stationary axis of rotation element
271 slot
272 displaceable axis of rotation element
273 leaf spring element
274 tension web elements
275 flange elements
276 solid housing
277 solid plate segments
325 holding device
325C holding plate element 326 fourth possible guide roller device
336 first guide element
337 second guide element
338 holding device
341 holding sheet metal element
360 roller holding apparatus
361 first roller element pair
362 second roller element pair
363 first guide path
364 second guide path
367 locating bearing roller element
368 floating bearing roller element
369 stationary axis of rotation elements
371 slots
372 displaceable axis of rotation elements
373 leaf spring element
374 tension web element
375 flange element
376 housing
376A lower housing part
378 roller element arrangement
379 single roller element
382 further stationary axis of rotation element
383 first guide surfaces
384 further guide surfaces
385 space
425 holding device
425C holding plate element
426 fifth possible linear roller guide device
426B first end
426C second end
436 first guide element
437 second guide element
438 U-shaped tube element
438A first tube element limb
438B second tube element limb
438C U-shaped tip
440 holding device
441 holding sheet metal element
467 locating bearing roller element
468 floating bearing roller element
469 stationary axis of rotation element
471 slot
472 displaceable axis of rotation element
473 leaf spring element
474 tension web elements
475 flange element
476 solid housing
478 roller element arrangement
479 single roller element
482 further stationary axis of rotation element
483 first guide surface
484 further guide surface
485 space
486A first curvature portion
486B second curvature portion
486C third curvature portion
486D fourth curvature portion
526 sixth possible linear roller guide device
536 guide element
560 roller holding apparatus
567 locating bearing roller elements
578 roller element arrangement
590 additional sliding element
591 press-on direction
592 retraction pin element
593 sliding groove
594 elongate material recess
636 guide element
678 roller element arrangement
736 guide element
761 first roller element pair
762 second roller element pair
778 roller element arrangement
836 guide element
878 roller element arrangement
936 guide element
961 first roller element pair
962 second roller element pair
978 roller element arrangement
1036 guide element
1061 first roller element pair
1062 second roller element pair
1078 roller element arrangement
1136 guide element
1161 first roller element pair
1162 second roller element pair
1178 roller element arrangement

What is claimed is:

1. A vehicle seat, comprising:
a seat part,
a backrest comprising a lower backrest part and an upper backrest part,
a holding device, by means of which the upper backrest part is mounted displaceably with respect to the lower backrest part, wherein the holding device comprises a guide roller device, by means of which the upper backrest part is arranged to be laterally displaceable with respect to the lower backrest part along a displacement curve so as to mount the upper backrest part displaceably at least in part past a side edge of the lower backrest part, and
wherein the guide roller device is configured so that the upper backrest part additionally rotates about at least a portion of the displacement curve and about a transverse axis extending in a transverse manner to the displacement curve, during the lateral displacement.

2. The vehicle seat according to claim 1, wherein the guide roller device is configured helically at least in part.

3. The vehicle seat according to claim 1, wherein the guide roller device comprises two guide elements arranged above and at a distance from one another, one of the guide elements being positioned differently from the other guide element on the path of the displacement curve.

4. The vehicle seat according to claim 3, wherein at least one of the guide elements is a circular rod.

5. The vehicle seat according to claim 1, wherein the guide roller device comprises a roller element arrangement for guiding a guide element having one or more locating bearing roller elements and having one or more floating bearing roller elements.

6. The vehicle seat according to claim 1, wherein the guide roller device comprises a roller element arrangement for guiding a guide element having two locating bearing roller elements and at least one floating bearing roller element, or vice versa.

7. The vehicle seat according to claim 1, wherein the guide roller device comprises a roller holding apparatus, on which roller element arrangements are mounted for guiding at least two guide elements arranged side by side and at a distance from one another.

8. The vehicle seat according to claim 7, wherein at least one of the guide elements is guided by means of a roller arrangement of three identical concavely formed roller elements.

9. The vehicle seat according to claim 1, wherein the guide roller device comprises at least two guide paths spaced apart from one another for guiding at least two guide elements arranged side by side and at a distance from one another.

10. A utility motor vehicle, comprising at least one vehicle seat, characterised by a vehicle seat according to claim 1.

\* \* \* \* \*